US011649805B2

(12) United States Patent
Paré et al.

(10) Patent No.: US 11,649,805 B2
(45) Date of Patent: May 16, 2023

(54) MODULAR WIND TURBINE INCLUDING WIND DIRECTING FEATURES, SYSTEMS, AND METHODS OF USE THEREOF

(71) Applicant: KKR IP LLC, West Warwick, RI (US)

(72) Inventors: Karen Anne Paré, West Warwick, RI (US); James Work Bailar, West Warwick, RI (US)

(73) Assignee: KKR IP LLC, West Warwick, RI (US)

( * ) Notice: Subject to any disclaimer, the term of this patent is extended or adjusted under 35 U.S.C. 154(b) by 0 days.

(21) Appl. No.: 17/411,906

(22) Filed: Aug. 25, 2021

(65) Prior Publication Data

US 2022/0065225 A1   Mar. 3, 2022

Related U.S. Application Data

(60) Provisional application No. 63/071,120, filed on Aug. 27, 2020.

(51) Int. Cl.
*F03D 9/00* (2016.01)
*H02P 9/04* (2006.01)
(Continued)

(52) U.S. Cl.
CPC .............. *F03D 7/045* (2013.01); *F03D 1/02* (2013.01); *F03D 1/04* (2013.01); *F03D 7/0224* (2013.01);
(Continued)

(58) Field of Classification Search
CPC . F03D 1/02; F03D 1/04; F03D 7/0224; F03D 7/0276; F03D 7/045; F03D 13/20;
(Continued)

(56) References Cited

U.S. PATENT DOCUMENTS 5,520,505 A      5/1996 Weisbrich
8,299,640 B2 *  10/2012 Pare .................. F03D 17/00
                                                      290/44

(Continued)

FOREIGN PATENT DOCUMENTS

DE     102016007054 A1 * 12/2017

OTHER PUBLICATIONS

Machine translation of DE102016007054A1, obtained from Espace.net on Jan. 25, 2023. (Year: 2017).*

*Primary Examiner* — Tulsidas C Patel
*Assistant Examiner* — Thomas K Quigley
(74) *Attorney, Agent, or Firm* — ArentFox Schiff LLP

(57) ABSTRACT

A modular wind turbine system and a method of use thereof are provided. The system comprises: a mounting frame; a fixed toroidal support structure attached to the mounting frame, the toroidal support structure having a concave portion and a convex portion; a wind turbine located proximal to the concave portion of the toroidal support structure, wherein the wind turbine travels about at least a portion of the concave portion of the toroidal support structure; and a first baffle, wherein the first baffle extends about the portion of the concave portion of the toroidal support structure about which the first turbine travels, wherein the baffle surrounds a portion of the wind turbine opposite the fixed toroidal support structure, and wherein the baffle includes at least one component selectively variably adjustable so as to vary the force, direction, or disruption of flow of fluid thereby, relative to the wind turbine.

21 Claims, 20 Drawing Sheets

(51) Int. Cl.
  *F03D 7/04*     (2006.01)
  *F03D 1/04*     (2006.01)
  *F03D 13/20*    (2016.01)
  *F03D 7/02*     (2006.01)
  *F03D 1/02*     (2006.01)

(52) U.S. Cl.
  CPC ........... *F03D 7/0276* (2013.01); *F03D 13/20* (2016.05); *F05B 2240/121* (2013.01); *F05B 2250/711* (2013.01); *F05B 2250/712* (2013.01); *F05B 2270/101* (2013.01); *F05B 2270/32* (2013.01); *F05B 2270/327* (2013.01); *F05B 2270/328* (2013.01); *F05B 2270/404* (2013.01); *F05B 2270/805* (2013.01)

(58) Field of Classification Search
  CPC .......... F05B 2240/121; F05B 2270/101; F05B 2270/32; F05B 2270/327; F05B 2270/328; F05B 2270/805
  See application file for complete search history.

(56) References Cited

U.S. PATENT DOCUMENTS

| | | | |
|---|---|---|---|
| 8,961,103 B1* | 2/2015 | Wolff | F03D 3/02 |
| | | | 415/4.4 |
| 9,328,715 B2* | 5/2016 | Pare | F03D 17/00 |
| 2003/0025334 A1* | 2/2003 | McDavid, Jr. | F04D 1/04 |
| | | | 290/54 |
| 2009/0008939 A1* | 1/2009 | Pare | F03D 7/042 |
| | | | 416/61 |
| 2013/0058792 A1* | 3/2013 | Pare | F03D 13/20 |
| | | | 416/244 R |
| 2020/0200143 A1* | 6/2020 | Bird | F03D 9/25 |

\* cited by examiner

Computer Aided Fluid Dynamic Studies Shows wing attachment, note angle of attachment is important
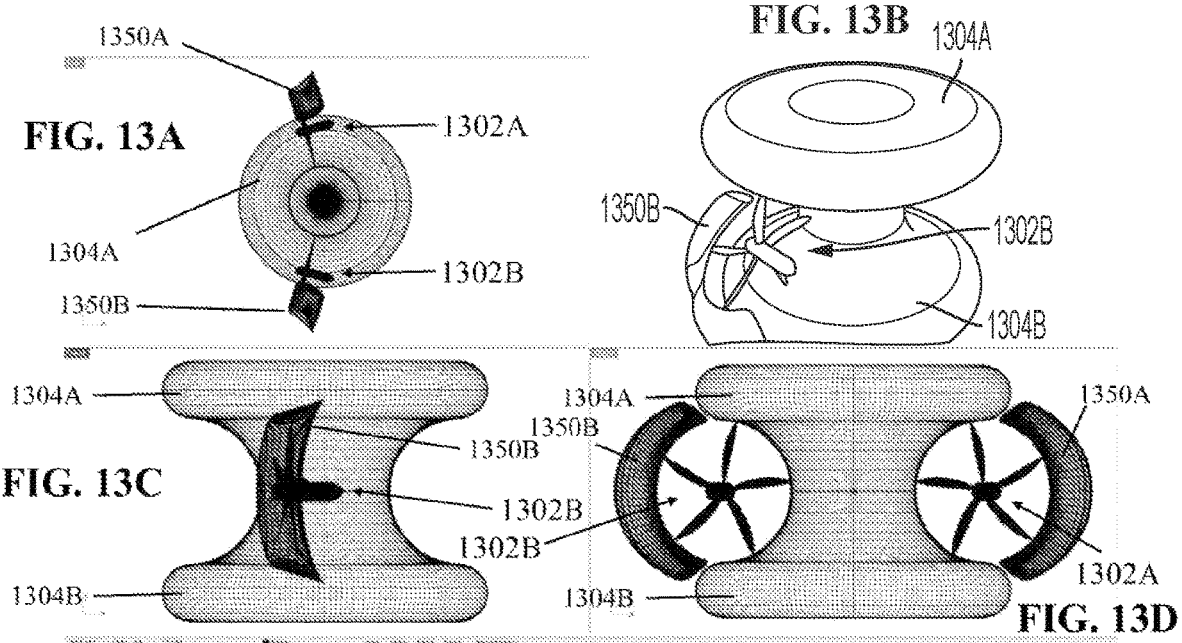
FIG. 13A
FIG. 13B
FIG. 13C
FIG. 13D
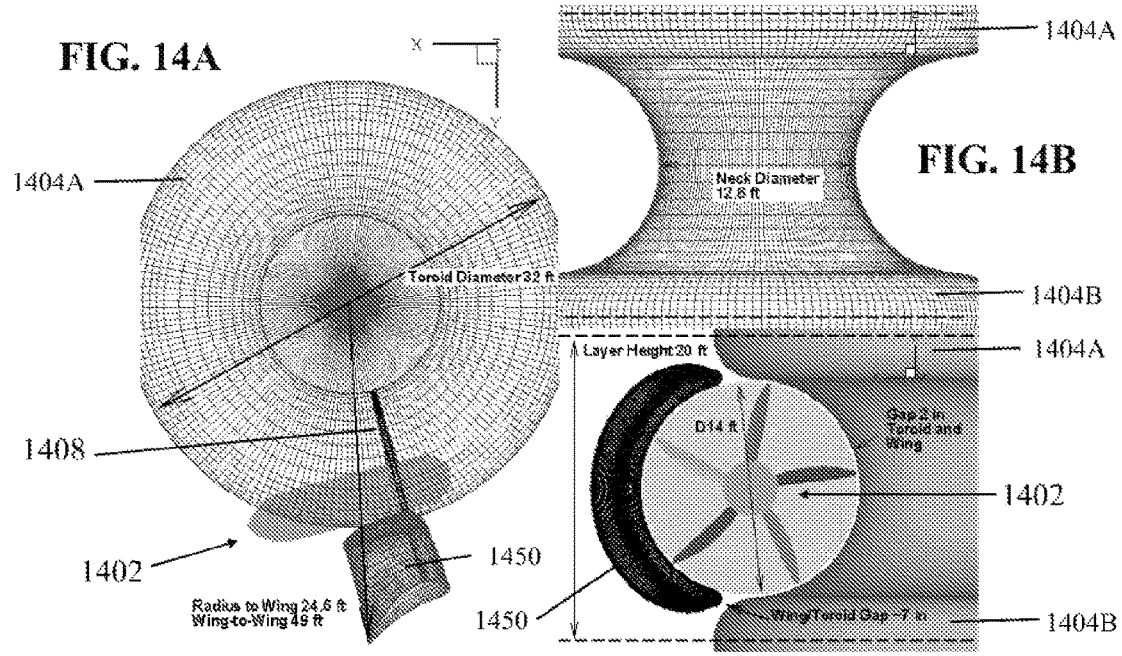
FIG. 14A
FIG. 14B
FIG. 14C

FIG. 20C

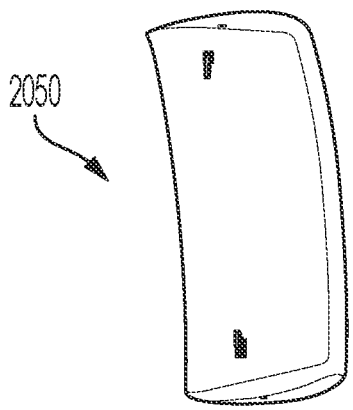

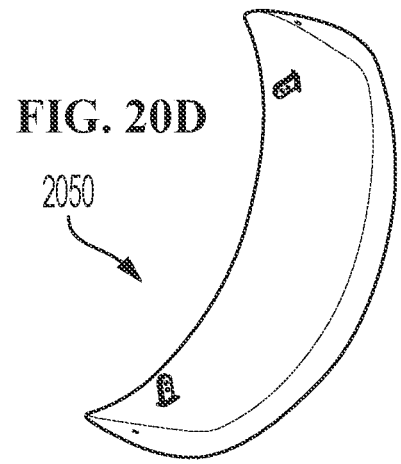

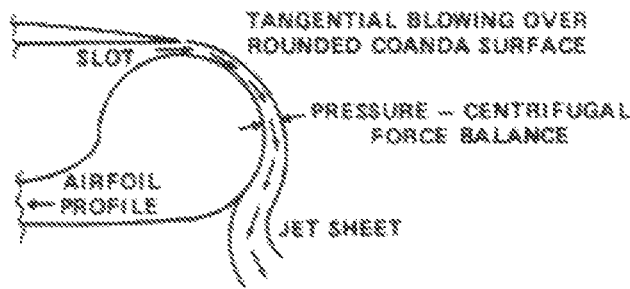

FIG. 20E

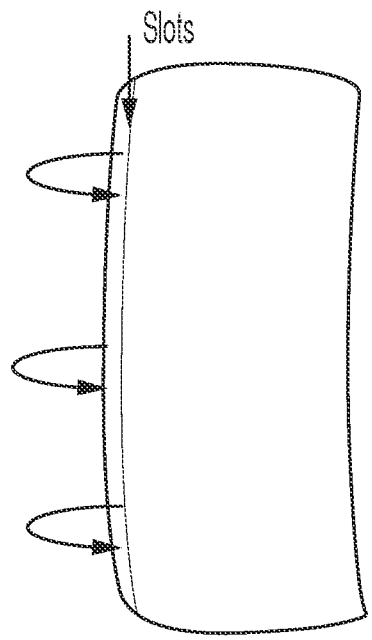

Slots

Circulation control wing
From Wikipedia, the free encyclopedia
A circulation control wing (CCW) is a form of high-lift device for use on the main wing of an aircraft to increase the lift coefficient. CCW technology has been in the research and development phase for over sixty years, and the early models were called blown flaps.[1]
The CCW works by increasing the velocity of the airflow over the leading edge and trailing edge of a specially designed aircraft wing using a series of blowing slots that eject high pressure jet air. The wing has a rounded trailing edge to tangentially eject the air through the Coanda effect thus causing lift.[2] The increase in velocity of the airflow over the wing also adds to the lift force through conventional airfoil lift production Extending flaps increases the camber of the wing airfoil, thus raising the maximum lift coefficient. This increase in maximum lift coefficient allows the wing to generate a given amount of lift with a slower speed. Therefore, extending the flaps reduces the speed of the air which may help in higher wind speeds. The use of a flaps will help with potential air pockets around the generator.

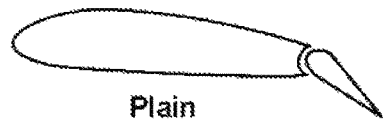

FIG. 22A Plain

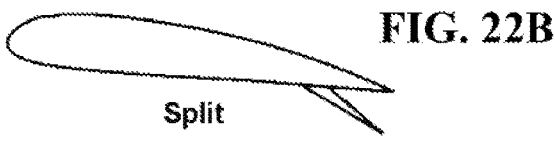

FIG. 22B Split

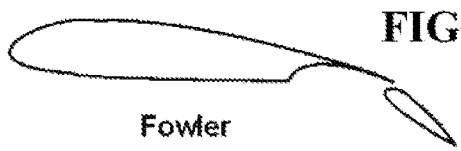

FIG. 22C Fowler

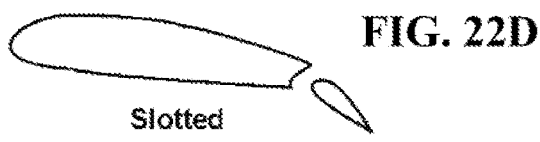

FIG. 22D Slotted

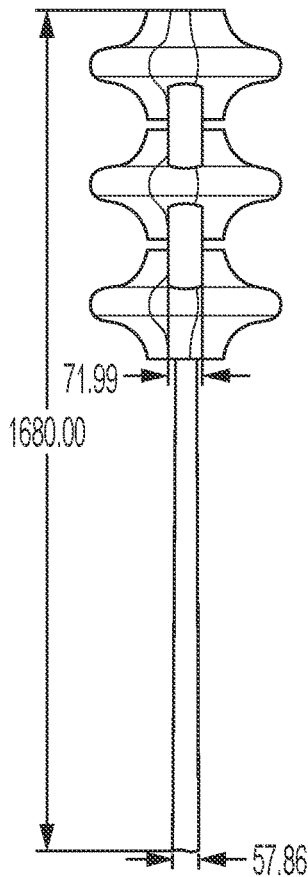

FIG. 23

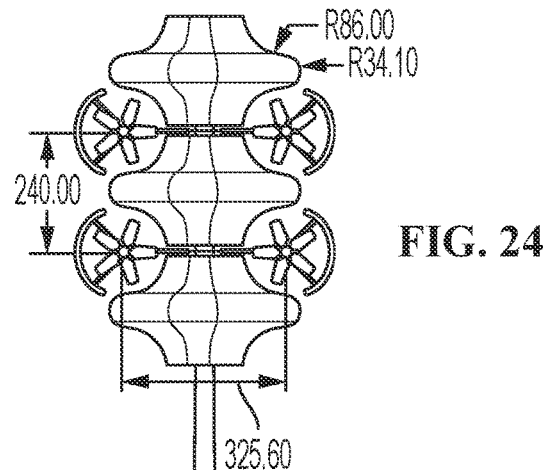

FIG. 24

Current 2-layer [Advanced Chemical] Meas: Inches 05.18.2010

FIG. 27A
FIG. 27B
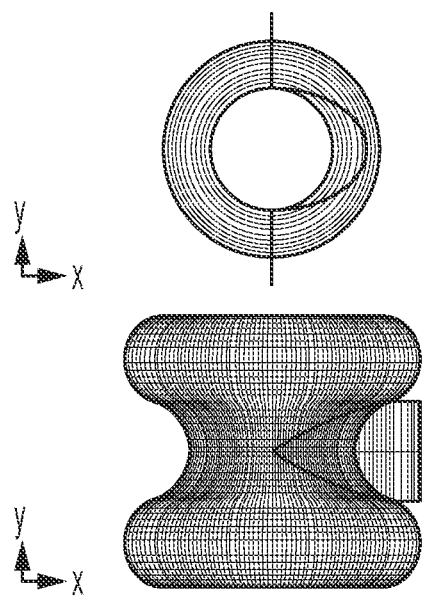
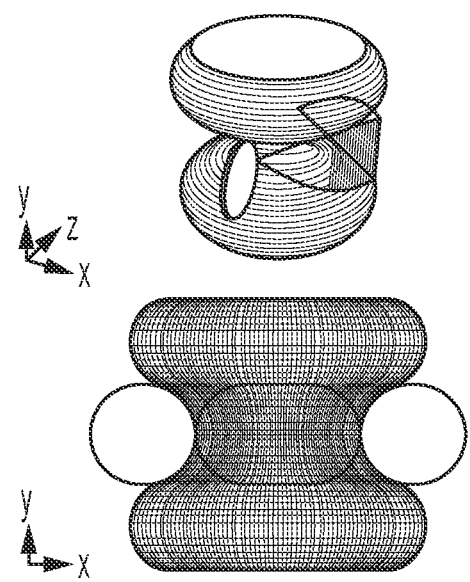
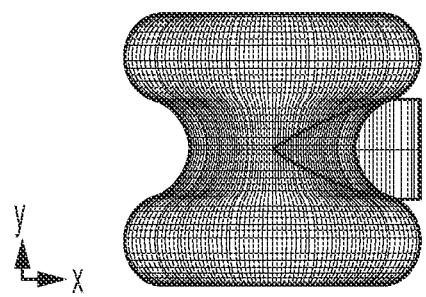
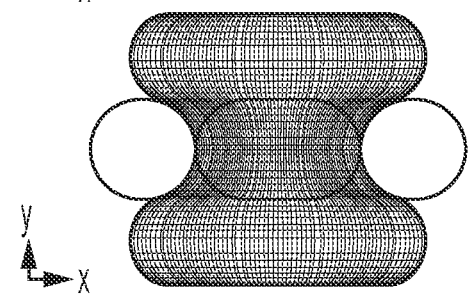
FIG. 27C
FIG. 27D
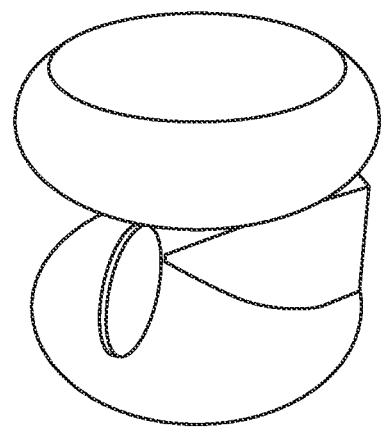
FIG. 28

MODULAR WIND TURBINE INCLUDING WIND DIRECTING FEATURES, SYSTEMS, AND METHODS OF USE THEREOF

CROSS-REFERENCE TO RELATED APPLICATIONS

This application claims benefit of priority under 35 U.S.C. 119(e) to U.S. Provisional Application No. 63/071,120, filed on Aug. 27, 2020, which is incorporated by reference in its entirety herein.

FIELD OF TECHNOLOGY

Aspects of the present disclosure relate to the field of wind turbine power generation, and in particular to a multi-turbine, multi-directional modular wind turbine that may further include an optionally inflatable ribbed toroidal housing, propeller tracks, swivelably reversible turbines, and air flow directing shrouds or other wind directing features.

BACKGROUND

Conventional wind turbines have several weaknesses. For example, single turbine units have large blades that may cause an unpleasant amount of noise during use. In addition to generating unacceptable levels of audible noise, conventional wind turbines often lack versatility and durability, and perform below needed performance levels.

In U.S. Pat. No. 5,520,505, which is incorporated herein by reference, a multi-turbine unit was proposed. This multi-turbine unit includes a stacked array of alternating rotating and fixed toroidal modules, wherein the rotating modules have four turbines attached. From an engineering point of view, for example, the multi-turbine unit described in U.S. Pat. No. 5,520,505 is difficult to implement in practical applications. Therefore, among other things, there is a need for improving the efficiencies and practicalities of wind turbines.

SUMMARY

Aspects of the present disclosure relate to providing a modular multi-turbine unit and to addressing the needs and weaknesses identified above, among others. An example modular multi-turbine unit of the present disclosure includes one or more of: optionally inflatable ribbed toroidal support structures, propeller tracks (also interchangeably referred to herein as "rails"), swivelably reversible turbines, and/or air flow directing shrouds. In other example aspects, methods and systems for using the modular multi-turbine unit are described. An example system of the present disclosure is designed to allow each of the plurality of turbines to rotate to a most efficient position relative to the wind for generating power. In one example implementation, the multi-turbine wind turbine, system, and methods of use thereof include a variety of blade and shroud features and a computer control system capable of positioning one or more of the plurality of turbines to most effectively generate power from the wind, as well as methods of use thereof.

In one example aspect, a wind turbine system is provided, wherein the wind turbine system comprises: a mounting frame; a fixed toroidal support structure attached to the mounting frame, the toroidal support structure having a concave portion and a convex portion; a wind turbine located proximal to the concave portion of the toroidal support structure, wherein the wind turbine travels about at least a portion of the concave portion of the toroidal support structure; and a first baffle, wherein the first baffle extends about the portion of the concave portion of the toroidal support structure about which the first turbine travels, wherein the baffle surrounds a portion of the wind turbine opposite the fixed toroidal support structure, and wherein the baffle includes at least one component selectively variably adjustable so as to vary the force, direction, or disruption of flow of fluid thereby, relative to the wind turbine.

In one example aspect, the wind turbine system further comprises a control system configurable for: monitoring and controlling operations of the wind turbine system, the controlling of the operations including at least causing the wind turbine or baffle to be positioned to maximize generation of power from wind.

In one example aspect, the control system further being configurable for: determining when the wind turbine is rotating at a speed greater than or equal to a threshold speed, the threshold speed being set to indicate that a rotation of the wind turbine at a speed exceeding the threshold speed is associated with a risk of damage to the wind turbine; and reducing the rotation speed of the wind turbine to a speed below the threshold speed.

In one example aspect, the rotation speed is reduced by at least one of: feathering at least one blade on the wind turbine, wherein the feathering includes at least altering a pitch of the at least one blade; and moving the wind turbine to a position that does not face directly into the wind.

In one example aspect, the control system further comprises a radar, wherein the radar is configurable to detect an object in a vicinity of the wind turbine, and wherein the detection of the object is performed prior to the object being in a physical contact with the wind turbine.

In one example aspect, when the object is detected by the radar, the control system takes an action to reduce damage to the wind turbine, the action including at least stopping one or more blades of the wind turbine.

In one example aspect, the control system stops only the blades with which the object is predicted as being likely to come into physical contact.

In one example aspect, the computer system further comprises: a predictive wind model control component configurable to control the rotation of the wind turbine to meet the wind based on a predictive model of wind tracking, wherein the controlling of the rotation is performed to position the wind turbine to a most efficient position for generating energy.

In one example aspect, the predictive model of the wind tracking is created based upon typical wind characteristics of an area in which the wind turbine is located.

In one example aspect, the computer system waits a predetermined amount of time after a shift in wind is detected before rotating the wind turbine to face into a new direction.

In one example aspect, the predetermined amount of time comprises at least an amount of time in which the wind typically returns to its previous direction based upon typical wind characteristics of the area in which the wind turbine is located.

In one example aspect, the toroidal support structure comprises carbon fiber.

In one example aspect, the toroidal support structure has a thickness of about ¼ inch and a corresponding strength to withstand 220 mile per hour winds.

In one example aspect, the toroidal support structure comprises a plurality of toroidal-shaped modular support structure elements, wherein the modular support structure elements are abuttably positioned in series so as to form two radially extending concave recesses; wherein the baffle is securably and radially moveably positioned relative to each recess so as to form therewith a respective wind-funneling opening with the wind turbine, and so as to be radially positionable relative to a wind direction, in concert with the baffle and the respective recess.

In one example aspect, the wind turbine system is configurable to switch between a first mode and a second mode, the first mode being for operating to generate power from the wind and the second mode is for operating, at least in part, as a motor in order to resist rotation from the wind, and wherein the switching between the first and second modes is based on wind speed.

In one example aspect, a method of positioning one or more of a plurality of wind turbines of the wind turbine system is provided. The positioning is performed to place the wind turbines to most effectively generate power from wind, wherein the positioning is performed by variably adjusting the force, direction, or disruption of flow of fluid thereby, relative to at least one of the plurality of wind turbines.

In one example aspect, the method further comprises: using a control system of the wind turbine system, determining when the wind turbine is rotating at a speed greater than or equal to a threshold speed, the threshold speed being set to indicate that a rotation of the wind turbine at a speed exceeding the threshold speed is associated with a risk of damage to the wind turbine; and reducing the rotation speed of the wind turbine to a speed below the threshold speed.

In one example aspect, the method further comprises: detecting an object in a vicinity of the wind turbine using a radar; and when the object is detected by the radar, using a control system of the wind turbine system, taking an action to reduce damage to the wind turbine, the action including at least stopping one or more blades of the wind turbine.

In one example aspect, a non-transitory computer readable medium storing thereon computer executable instructions for positioning one or more of a plurality of wind turbines of the wind turbine system is provided. The positioning is performed to place the wind turbines to most effectively generate power from wind, wherein the positioning is performed by variably adjusting the force, direction, or disruption of flow of fluid thereby, relative to at least one of the plurality of wind turbines.

In one example aspect, the instructions further comprise instructions for: determining when the wind turbine is rotating at a speed greater than or equal to a threshold speed, the threshold speed being set to indicate that a rotation of the wind turbine at a speed exceeding the threshold speed is associated with a risk of damage to the wind turbine; and reducing the rotation speed of the wind turbine to a speed below the threshold speed.

In one example aspect, the instructions further comprise instructions for: detecting an object in a vicinity of the wind turbine using a radar; and when the object is detected by the radar, taking an action to reduce damage to the wind turbine, the action including at least stopping one or more blades of the wind turbine.

Additional advantages and novel features of these aspects will be set forth in part in the description that follows, and in part will become more apparent to those skilled in the art upon examination of the following upon learning by practice of the disclosure.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIGS. 13A-14C illustrate various features and aspects relating to the positioning and interoperation of example toroidal-shaped or partially toroidal-shaped modular support structure elements propellers located therebetween, and air funneling shrouds or wings, in accordance with aspects of the present disclosure.

FIGS. 20A-20E show various views and aspects of another example wing or shroud, in accordance with aspects of the present disclosure.

FIG. 21 illustrates air foil effects that may apply and be useful to operation of shrouds or wings in the context of air flow management for wind turbines, as may be utilized in accordance with aspects of the present disclosure.

FIGS. 22A-22D show views of the cross-sectional shape of several example shrouds or wings, and various features thereof, including use of flaps, in accordance with aspects of the present disclosure.

FIGS. 23 and 24 present views of example towers having support structures, turbines, and shrouds or wings, in accordance with aspects of the present disclosure.

FIGS. 27A-27D show example representative views of example modular support structures forming a recess, turbines, and components of fluid (e.g., air) flow contours relative to the recess, in accordance with aspects of the present disclosure.

FIG. 28 shows another example representative view of example modular support structures forming a recess, turbines, and area of fluid (e.g., air) flow activity relative to the recess, in accordance with aspects of the present disclosure.

DETAILED DESCRIPTION

Figure 1:
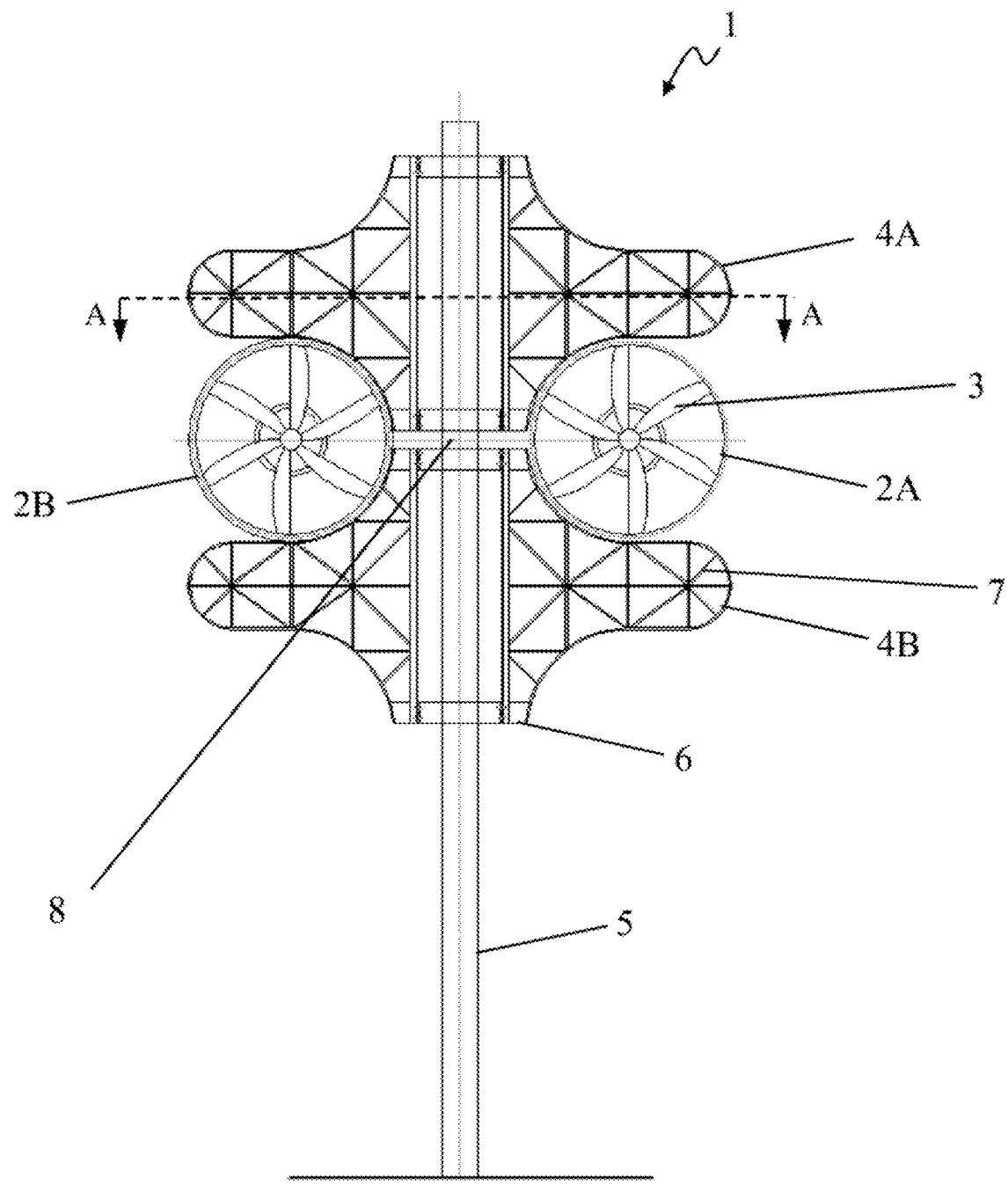
FIG. 1 shows an example wind turbine unit with two turbines each having six blades, in accordance with aspects of the present disclosure.

FIG. 1 shows an example wind turbine unit 1 with two turbines 2A, 2B each having six blades 3. The turbines 2A, 2b may be mounted so as to ride within an inner curve of one or more donut-type, toroidal shaped support structures 4A, 4B mounted to a tower 5. While two turbines are shown in the example of FIG. 1, alternatively more than two turbines may be provided, such as between a single pair of support structures 4A, 4B, or between a plurality of pairs of such structures. Further, although the turbines 2A, 2B are each depicted as having six blades 3, the turbines 2A, 2B may also or alternatively include two, three, four, or more blades. The plurality of turbines ensures that the power generation based on wind occurs almost continuously. In contrast, when a single turbine generator fails, it produces zero power. In the present disclosure, if one turbine fails, the other turbine or turbines may continue to produce power. For example, this may result in production of around 29/30, or 96.66% efficiency. Thus, unlike the conventional single turbine generator, for example, an example multi-turbine generator of the present disclosure may be resilient to single turbine failures.

Figure 2:
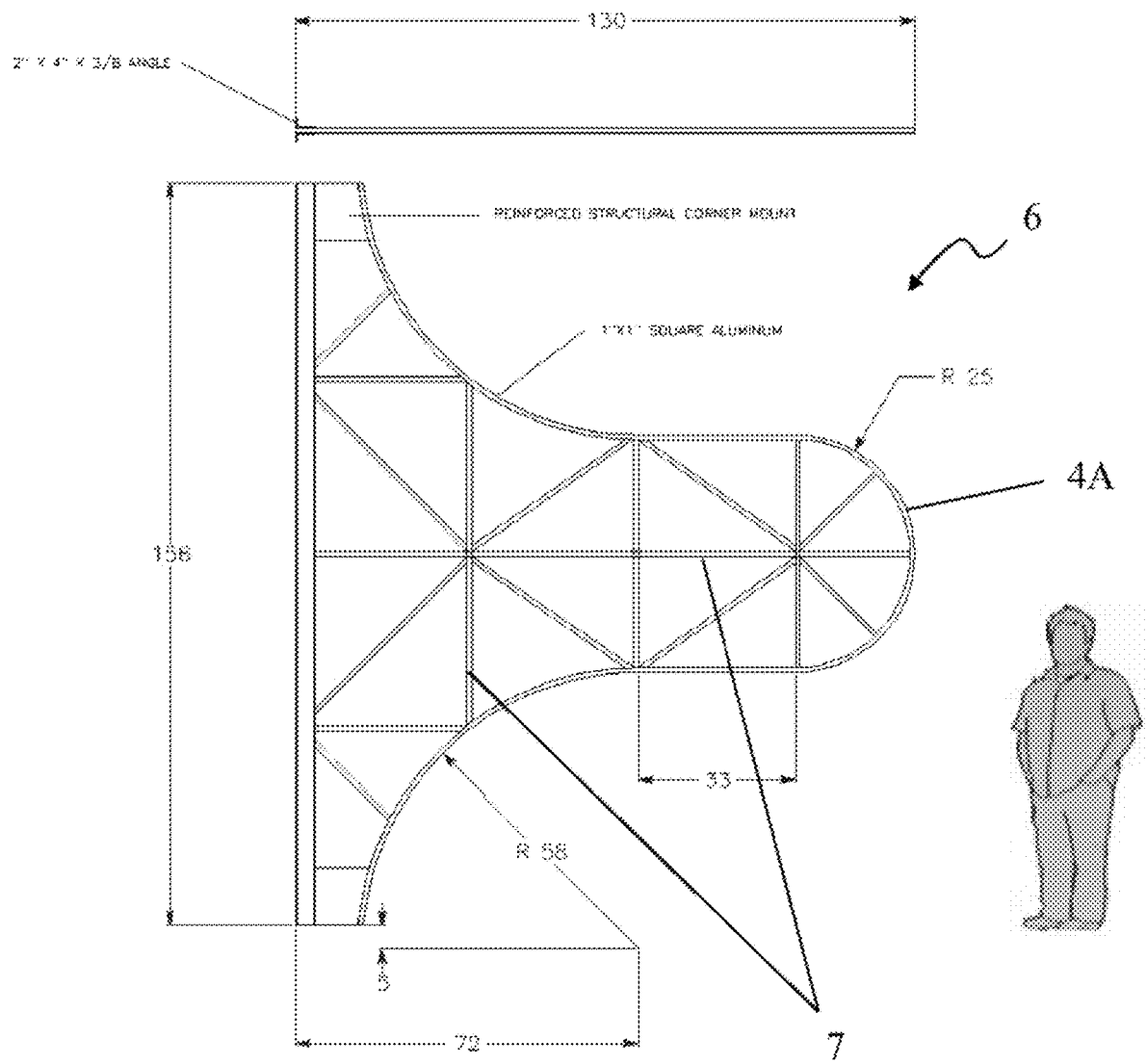
FIG. 2 shows a partial cross-sectional view of various features of the example wind turbine unit of FIG. 1.

In FIG. 1, the support structures 4A, 4B are depicted as being mounted using a lower supporting unit or saddle 6 and internal structural support elements 7. FIG. 2 illustrates a partial cross-sectional view of various features of the wind turbine of FIG. 1. Other mounting frames may be used alone or in connection with at least one of the saddle 6 and/or internal structural support elements 7 depicted in FIGS. 1 and 2. FIG. 1 further shows a tubular tower 5. However, other tower structures may be used such as a lattice type tower or a tower having a plurality of poles. In FIG. 1, the two turbines 2A, 2B, are shown as connected to a propeller track or other connecting structure 8. The turbines 2A, 2B may be connected to each other via the propeller track or other structure 8, which may be located within the inner curve of the toroidal shaped support structure. The attachment about the tower 5 may allow the turbines 2A, 2B to rotate around at least a portion of the circular propeller track 8.

By using a plurality of smaller turbines 2A, 2B as shown in FIG. 1, the turbine blades 3 of the present disclosure may be smaller sized than those in conventional single turbine units. Among other advantages, the approach of the present disclosure may significantly reduce the amount of noise produced by the wind turbine. In addition, the smaller turbines may not require gearboxes. Aspects of a turbine in accordance with the teachings of the present disclosure may allow the wind turbine unit to switch between acting as a motor and acting as a generator based on the wind speed. For example, the wind turbine unit may switch to act as a motor or to partially act as a motor in order to deal with high wind speeds (e.g., to resist rotation from the wind in order to prevent or lessen the likelihood of damage). In another example, the wind turbine unit may operate the turbine as a motor so as to bring the turbine blades up to a minimum speed for efficient operation, and then, at the proper speed, switch the wind turbine to act as a generator.

As shown in FIG. 1 and the partial cross-sectional view of a portion of 2, the support structure 4A, 4B may comprises fiberglass or similar material. However, in one example implementation, the toroidal support structure 4A, 4B may comprises carbon fiber. Elements of this structure 4A, 4B may have a thickness as little as about ¼ inch and yet have the strength to withstand 220 mile per hour winds.

The tower 1 shown in FIG. 1 may include a feature allowing it to rotate out of high winds in order to prevent damage to the wind turbine unit. For example, the tower 5 may be rotated 90 degrees toward the ground. The rotation may be provided via a hinge element of the tower 5, for example. After the tower 5 has rotated toward the ground, the tower 5 may be attached to a securing unit located at or near ground level. In one example implementation, the tower 5 may be locked to the top of a concrete foundation built on the ground, thereby securing the tower 5 parallel to the ground, out of damaging winds. Additional features as shown in applicant's U.S. Pat. No. 9,328,715 issued May 3, 2016, titled "Modular Wind Turbine Having a Rotating Feature and Method of Use Thereof," and U.S. Pat. No. 8,299,640 issued Oct. 30, 2012, each of which is incorporated by reference herein in its entirety.

Although FIG. 1 shows a single multi-turbine section 1, the pieces are modular so that a plurality of multi-turbine units may be stacked and mounted on a single tower 5. Each of the modular support structures 4A, 4B may be mounted to the tower 5. These support structures may be designed so as not to move, once they are emplaced. Propeller track or other structure 8 located about the outer circumference of the support structure 5 may allow for rotational movement of the turbines around at least a portion of the outer circumference of the support structure 5.

Figure 3:
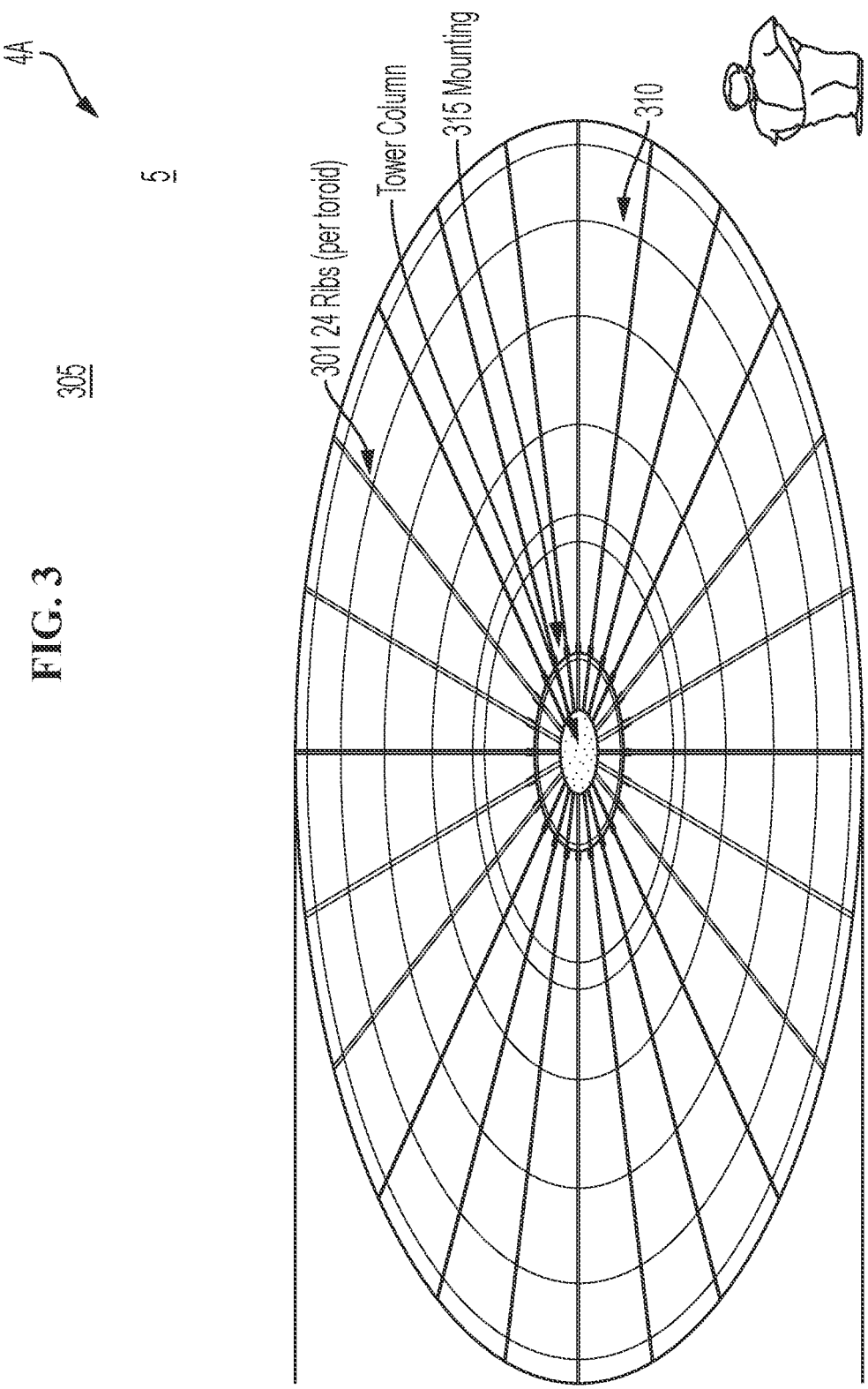
FIG. 3 shows a cross-sectional view of a portion of one of the support structures of the wind turbine unit of FIG. 1, taken along line A-A indicated in FIG. 1.

FIG. 3 shows a cross-sectional view of a portion of one of the support structures 4A of the wind turbine unit 1 of FIG. 1, taken along line A-A indicated in FIG. 1. This view shows a tower 5 at the center of the structure 4A, with the support structure 4A secured thereto via a mounting hub 301. The support structure 4A of FIG. 3 also shows 24 ribs 305 and 6 concentric hoops 310 forming at least a portion of the internal structure support elements 7 (FIG. 1) thereof. In addition, an outer hoop 315 may encompass or be located within the outer edge of the support structure 4A.

Figure 4A:
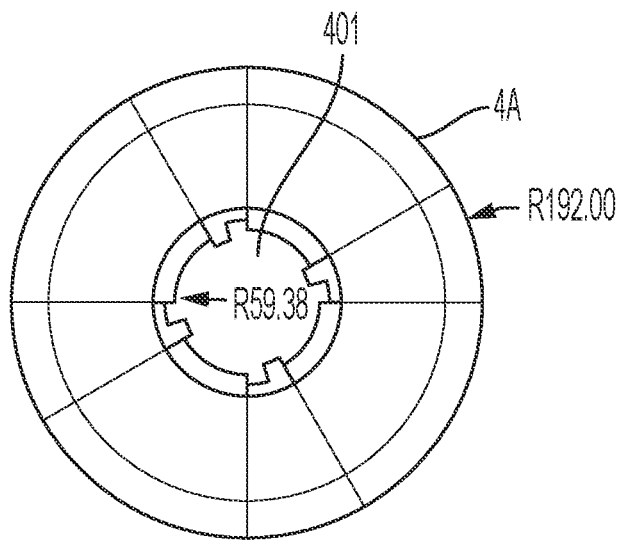
FIGS. 4A-4C show overhead, perspective, and side views, respectively, of the example modular support structure of FIG. 1.
Figure 4B:
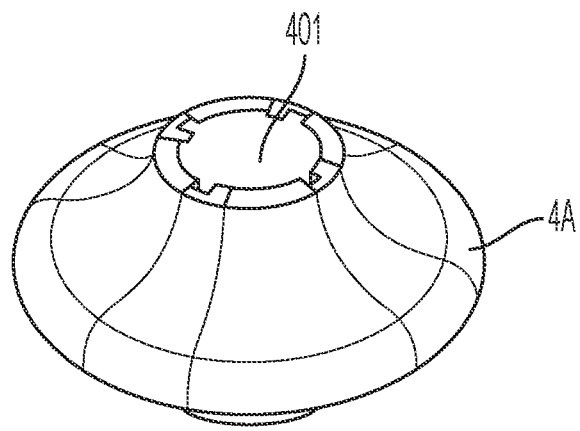
Figure 4C:
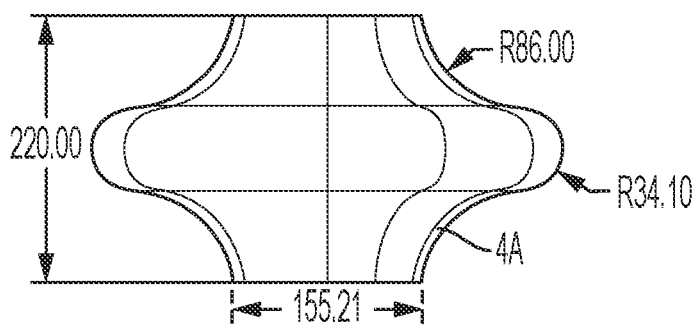

FIG. 4A shows an overhead view of the example modular support structure 4A of FIG. 1. FIG. 4B shows a perspective view of the example modular support structure 4A of FIG. 1. FIG. 4C shows a side view of the example modular support structure 4A of FIG. 1. As shown in FIGS. 4A-4C, the modular support structure 4A may include a central opening 401 through which the tower 5 (FIG. 1) may be received so as to secure the support structure 4A thereabout.

Figure 5:
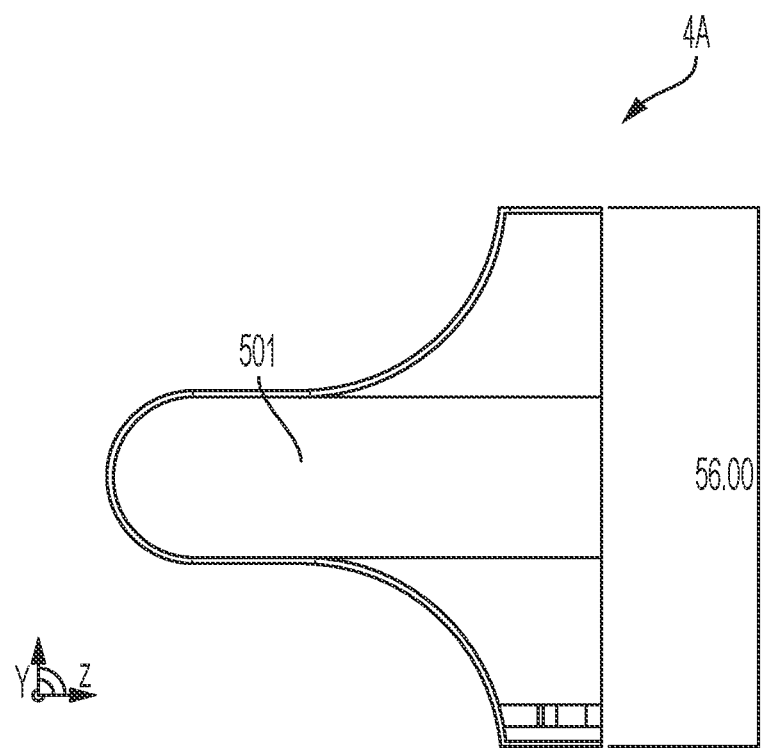
FIG. 5 presents a view of a portion of the modular support structure of FIGS. 1-4C, showing a surface skin located upon about the outer portion of the internal structural support elements of FIGS. 1-3.

FIG. 5 presents a view of a portion of the modular support structure 4A of FIGS. 1-4C, showing a surface skin 501 located upon about the outer portion of the internal structural support elements 7 (FIGS. 1-3). Such surface skin 501 may form an inflatable structure and comprise a strong, durable material. The inflatable structure may be inflated via a compressor or other source of fluid pressure located within the wind turbine unit (FIG. 1) or otherwise operationally engageable with the inflatable structure formed by the skin 501.

Figure 6:
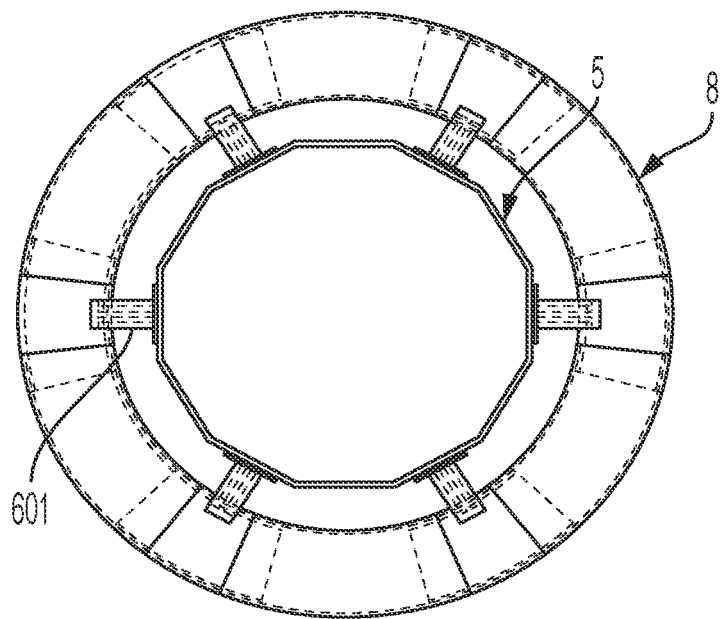
FIGS. 6 and 7 show overhead and perspective views, respectively, of an example propeller track or other connecting structure, which may, for example, be mounted to a tower, in accordance with aspects of the present disclosure.
Figure 7:
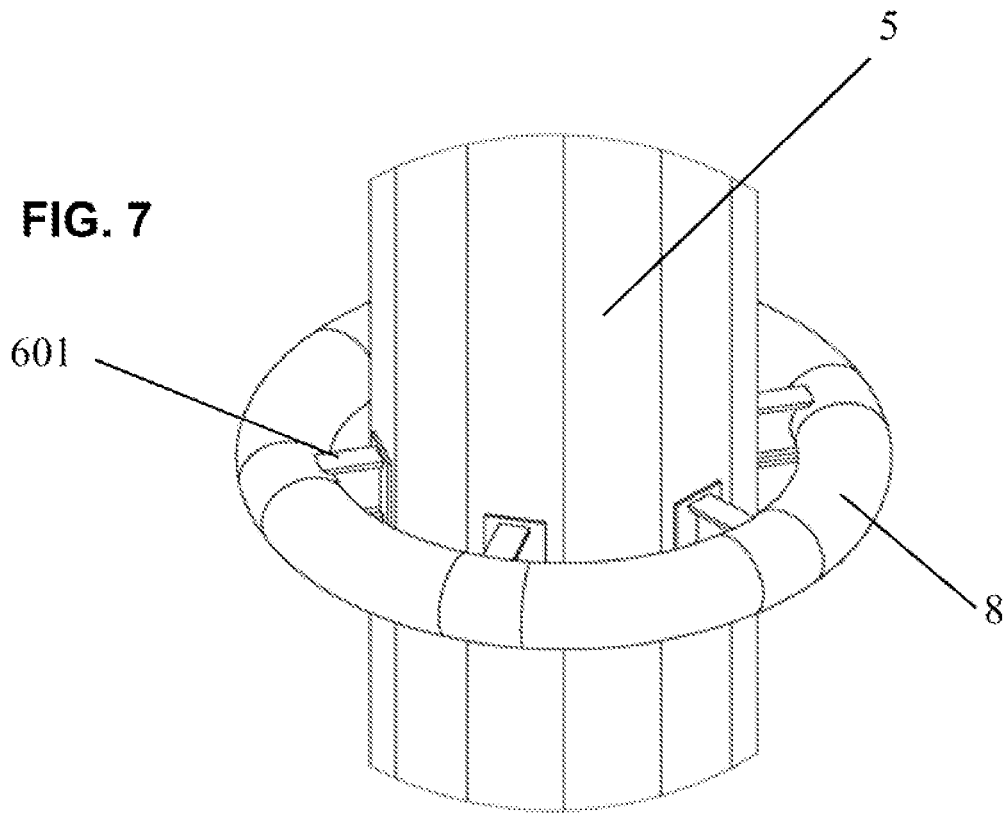

FIGS. 6 and 7 show overhead and perspective views, respectively, of an example propeller track or other connecting structure 8, which may, for example, be mounted to a tower 5. Propeller track or other connecting structure 8 may be mounted to the tower 5 by a plurality of propeller supports 601. The propeller track or other connecting structure 8 may allow each turbine 2A, 2B (FIG. 1) to move relative thereto (e.g., radially about the tower 5 along propeller track or other connecting structure 8), such as via one or more motors interoperating with the propeller track or other connecting structure 8, tower 5, and/or one or more turbines 2A, 2B (FIG. 1). This arrangement allows, for example, the two turbines to revolve approximately 180 degrees about the tower 5 in order to face into the wind. In another example implementation, the turbines may revolve up to 360 degrees.

Figure 8:
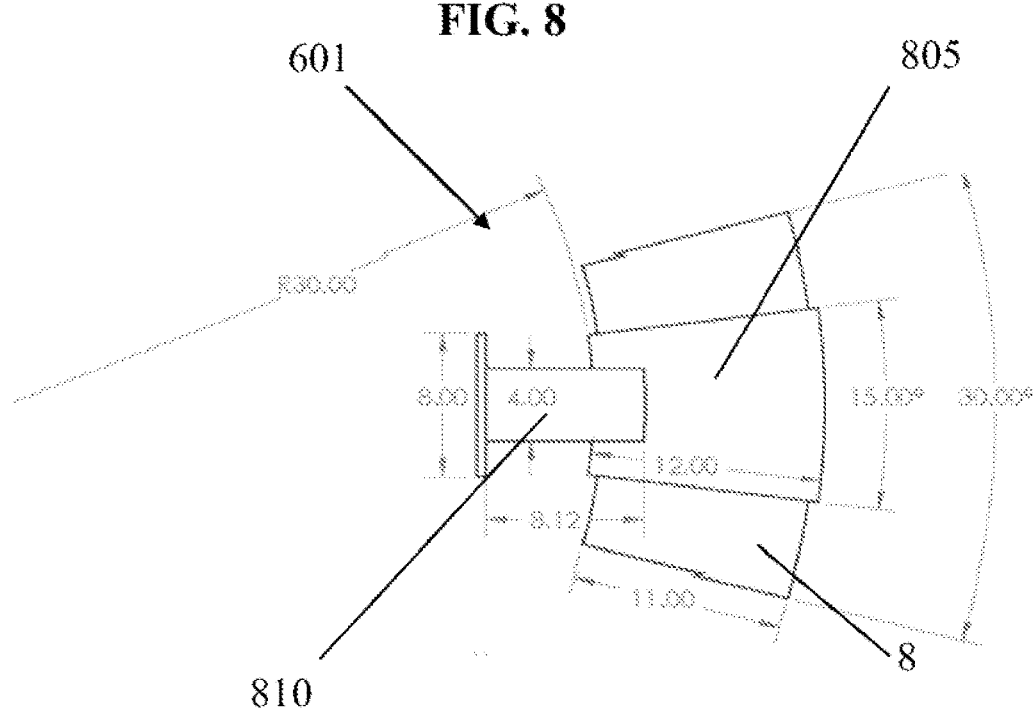
FIGS. 8-10 show views of various portions and features of the propeller track or other connecting structure of FIGS. 6 and 7.
Figure 9:
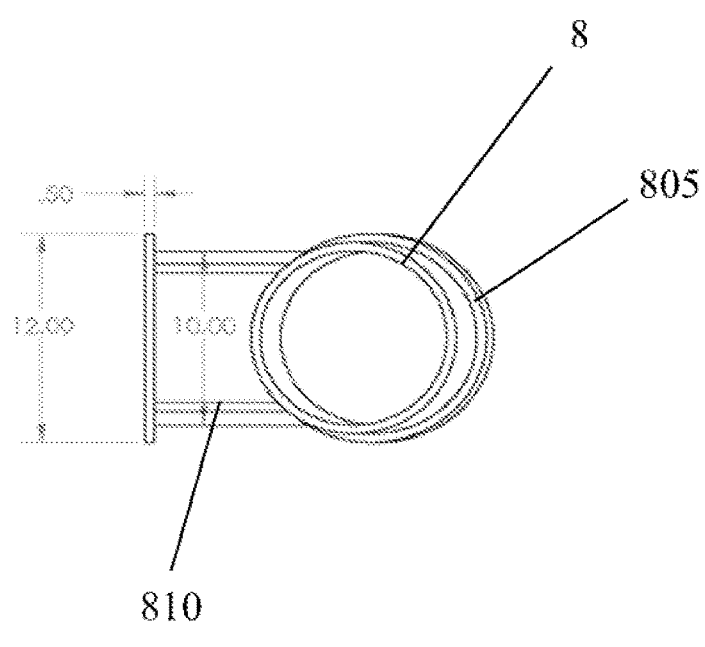
Figure 10:
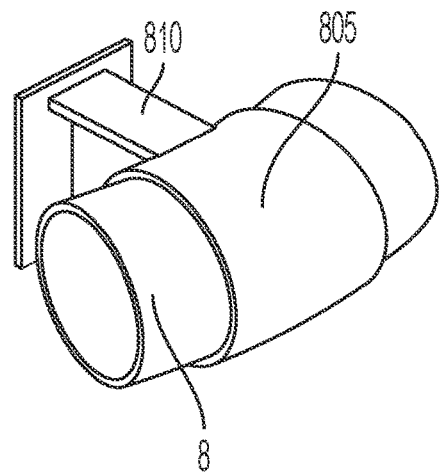

FIGS. 8-10 show views of various portions and features of the propeller track or other connecting structure 8 (FIGS. 6 and 7), including, for example, a reinforcing band portion 805 forming aspects of and/or surrounding a portion of propeller track or other connecting structure 8, and one or more extending arm portions, 810 which may be attached to or formed with the tower 5 (FIGS. 6, 7).

Figure 11:
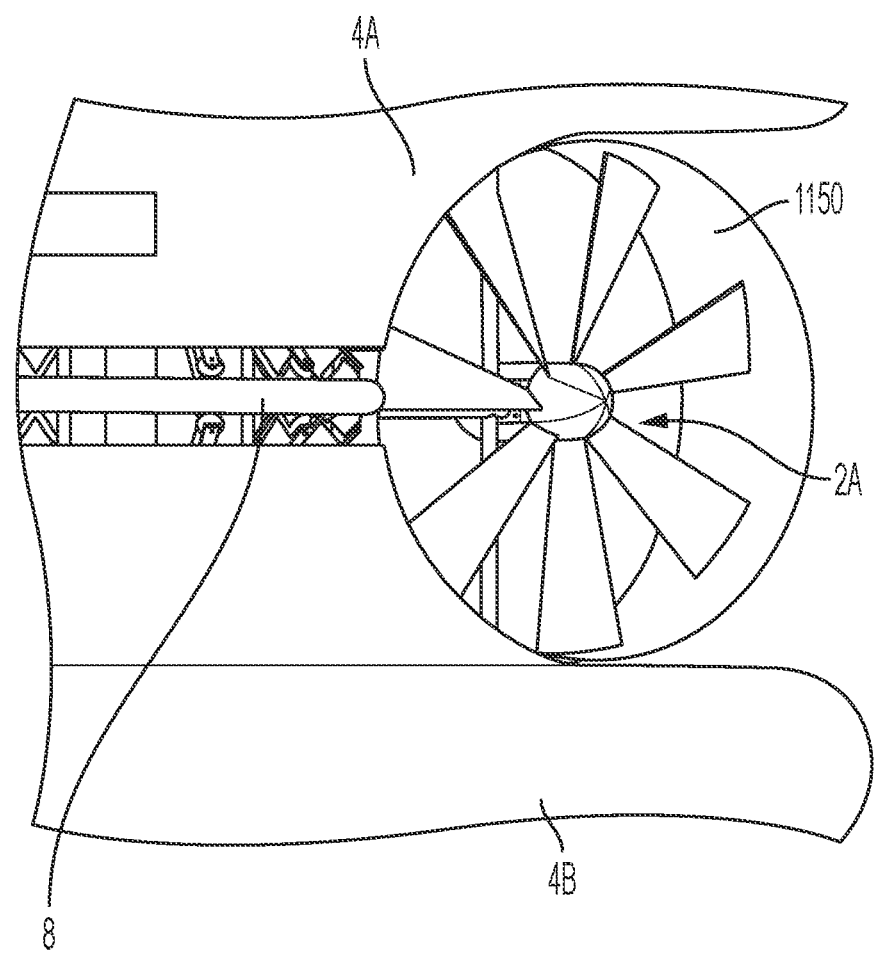
FIG. 11 shows a partial perspective view of an example turbine positioned relative to portions of two components of the example modular support structure, in accordance with aspects of the present disclosure.

FIG. 11 shows a partial perspective view of an example turbine 2A positioned relative to portions of two components of the example modular support structure 4A, 4B. Also shown in FIG. 11 is the propeller track or other connecting structure 8. In addition, shown in FIG. 11 is an air funneling shroud or wing element 1150, also interchangeably referred to herein as a "baffle," associated with the turbine 2A, which may help efficiently direct air flow across the blades of the turbine 2A. In FIG. 11, baffles 1150 directs air flow toward the turbine 2A, with the baffle 1150 shown as interoperating with the portion of the toroidal support structure 4A, 4B that surrounds and houses the turbine 2A. In this example implementation, the turbine 2A may be mounted proximal to the inner circumference of the support structures 4A, 4B in a stationary manner for example, with the baffle 1150 attached in a rotational manner so that the baffle 1150 may rotate relative to the circumferential inner portion of the support structure 4A, 4B In this manner, the baffle 1150 may be variably adjusted so as to increase the capture of air flow of the wind and direct the air flow more efficiently toward the turbine 2A. In the example implementation shown in FIG. 11, the baffle 1150 may include a top attachment portion located proximal to the outer curve edge of one support structure 4A and a lower attachment portion located proximal to outer curve edge of the other support structure 4B, such that the baffle 1150 thereby works with the curved portions of the support structure 4A, 4B to surround the turbine 2A and cooperate to direct airflow thereto.

Figure 12:
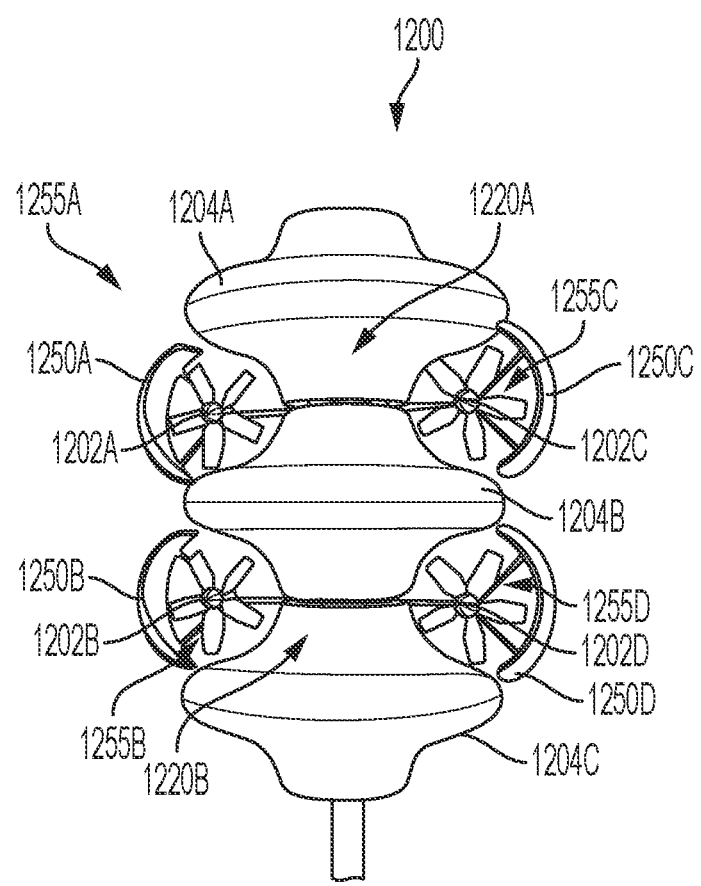
FIG. 12 shows a representative image of a support structure or tower having three example toroidal-shaped modular support structure elements, in accordance with aspects of the present disclosure.

FIG. 12 shows a representative image of a support structure or tower 1200 having three example toroidal-shaped modular support structure elements 1204A, 1204B, 1204C abuttably positioned in series so as to form two radially extending concave recesses 1220A, 1220B. Air funneling shrouds or wings 1250A, 1250B, 1250C, 1205D are each securably and radially moveably positioned relative to recesses 1220A, 1220B so as to form therewith respective wind-funneling openings 1255A, 1255B, 1255C, 1255D, within each of which one of the turbines 1202A, 1202B, 1202C, 1202D is securably located, so as to be radially positionable relative to a wind direction, in concert with the corresponding shroud or wing 1250A, 1250B, 1250C, 1250D, and recesses 1220A, 1220B.

FIGS. 13A-14C illustrate various features and aspects relating to the positioning and interoperation of example toroidal-shaped or partially toroidal-shaped modular support structure elements 1304A, 1304B, 1404A, 1404B, propellers 1302A, 1302B, 1402 located therebetween, and air funneling shrouds or wings 1350A, 1350B, 1450. As shown in FIGS. 13A-14C, various shapes, sizes, positions, orientations, and example dimensions may be used for both the support structures 1304A, 1304B, 1404A, 1404B and the wings 1350A, 1350B, 1450A, so as to vary directional wind flow and funnel size and shape, which may produce a variety of corresponding air flow patterns directed to turbines 1302A, 1302B, 1402.

FIG. 13A presents an overhead cross-sectional view of the example modular support structure 1304A that includes two turbines 1302A, 1302B, and two corresponding shrouds or wings 1350A, 1350B that are shaped and positioned relative thereto. FIG. 13B show a perspective view of the structure 1304A, 1304B and one of the turbines 1302B and corresponding shroud or wing 1350B. FIG. 13C shows a first side view of the structures 1304A, 1304B and one of the turbines 1302B and corresponding wing 1350B. FIG. 13D shows a second side view of the structures 1304A, 1304B, along with both of the turbines 1302A, 1302B and corresponding shrouds or wings 1350A, 1350B.

FIG. 14A presents an overhead cross-sectional view of the example modular support structure 1404A, which includes a turbine 1402 and a corresponding shroud or wing 1450 that is shaped and positioned relative thereto. In addition, joint radial movement of the turbine 1402 and shroud or wing 1450 may be facilitated, such as to appropriately be positioned relative to a wind direction, for example. FIG. 14B shows a side view of the structures 1404A and 1404B, and FIG. 14C shows a cross-sectional side view of a portion of the structures 1404A, 1404B, as well as the turbine 1402 and corresponding shroud or wing 1450.

Figure 15A:
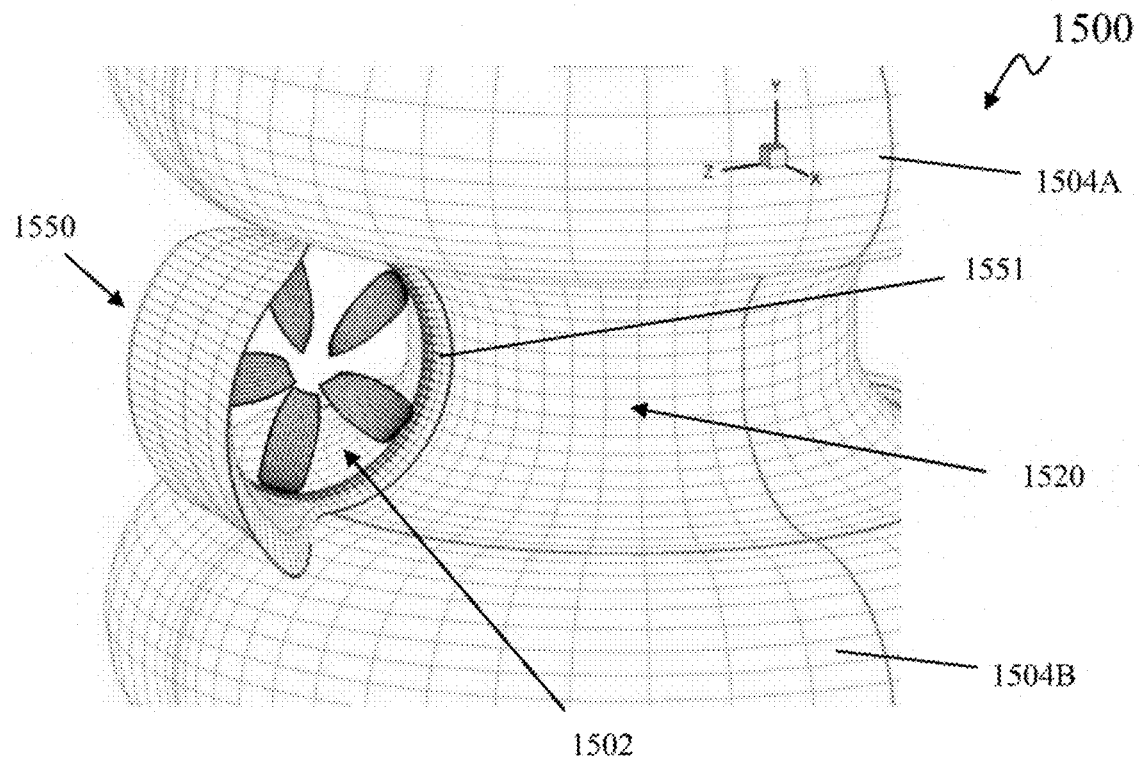
FIGS. 15A, 15B, and 15C show a perspective and side views, respectively, of a portion of a tower that includes modular support structures forming a recess, in accordance with aspects of the present disclosure.
Figure 15B:
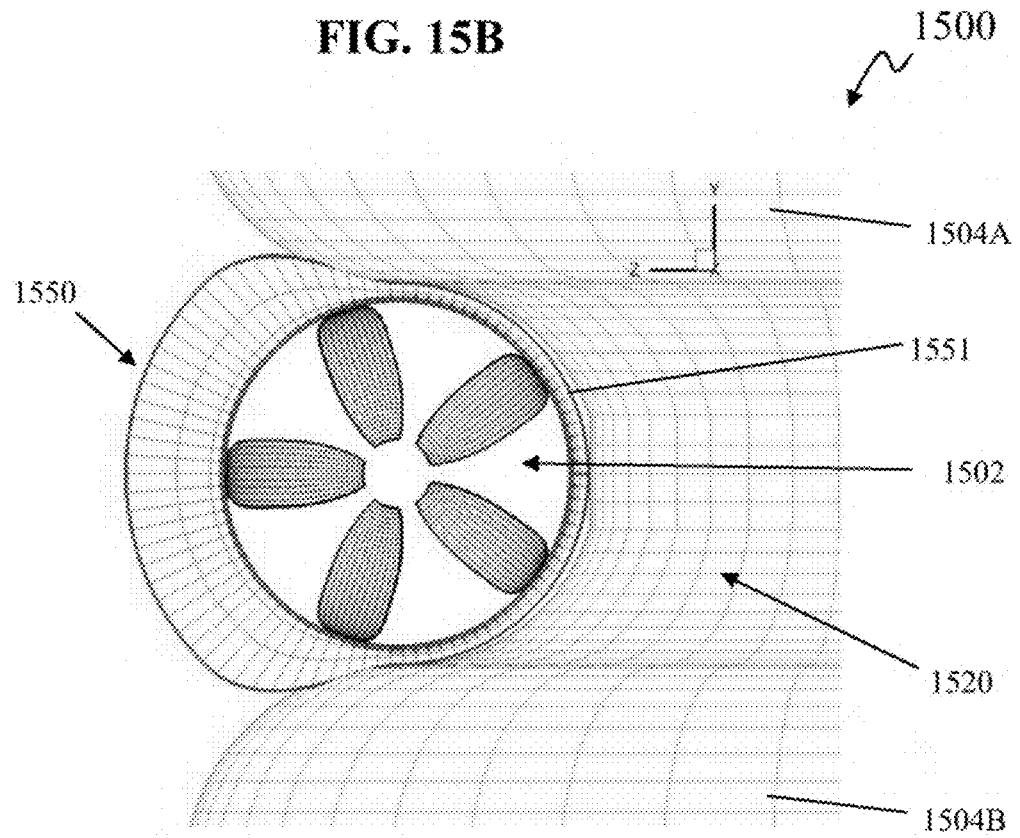
Figure 15C:
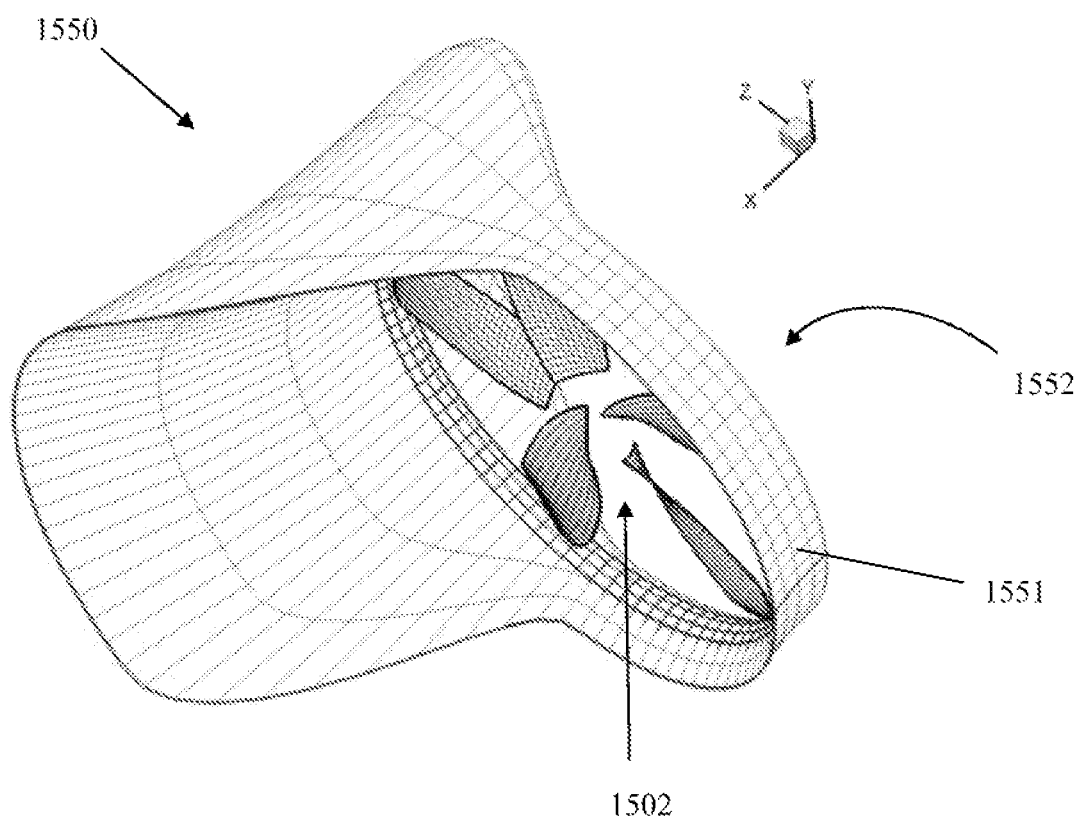

FIGS. 15A and 15B show a perspective view and a side view, respectively, of a portion of a tower 1500 that includes modular support structures 1504A, 1504B forming a recess 1520. A turbine 1502 having a corresponding shroud or wing 1550 is shown as partially located within the recess 1520. In FIGS. 15A and 15B, the shroud or wing 1550 is shown as fully encompassing the turbine 1502 in this example implementation, with a portion 1551 of the shroud or wing 1550 extends about the turbine 1502 proximal to and having a shape corresponding to the shape of the recess 1520. FIG. 15C shows a perspective view of the turbine 1502 of FIGS. 15A and 15B received within an opening 1552 in the shroud or wing 1550, wherein the shroud or wing includes a partial ring-shaped portion 1551, receivable within the recess 1520 (FIGS. 15A, 15B) when interoperating with modular structures 1504A, 1504B (FIGS. 15A, 15B).

Figure 16:
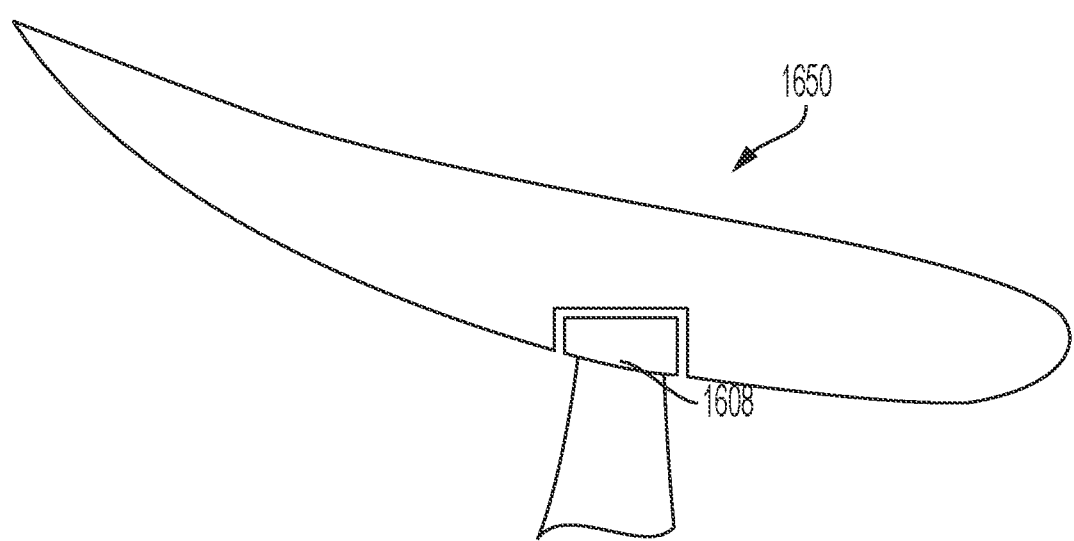
FIG. 16 shows a view of the cross-sectional shape of one example shroud or wing, along with an example track engagement structure, in accordance with aspects of the present disclosure.

FIG. 16 shows a view of the cross-sectional shape of one example shroud or wing 1650, along with an example track engagement structure 1608, which may be usable, for example, to move the shroud or wing 1650 radially relative to a tower and/or one or more support structures with which the shroud or wing 1650 is engaged.

Figure 17:
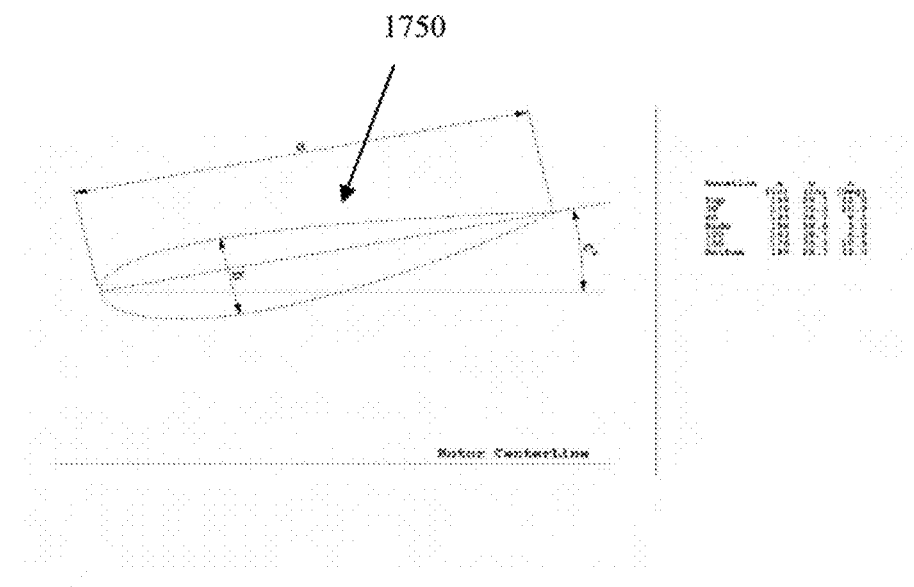
FIG. 17 shows a view of the cross-sectional shape of another example shroud or wing, usable in accordance with aspects of the present disclosure.

FIG. 17 shows a view of the cross-sectional shape of another example shroud or wing 1750, usable in accordance with aspects of the present disclosure.

Figure 18:
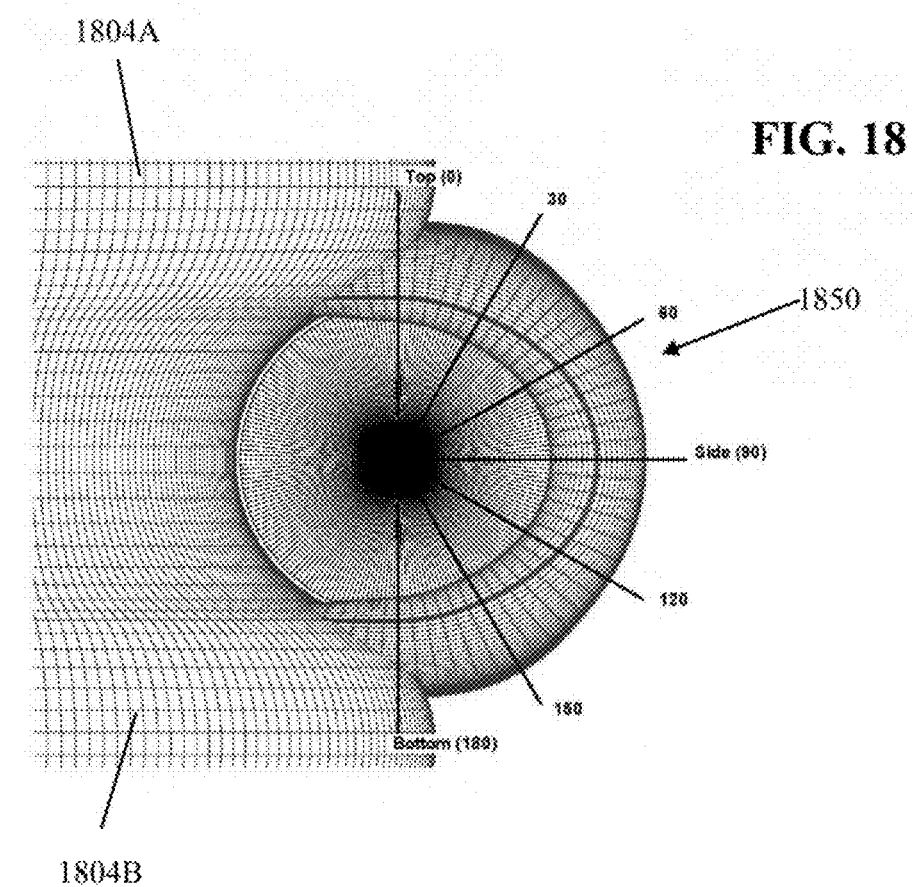
FIG. 18 shows a representative contour map of an example wing or shroud 1850 relative to modular structures, in accordance with aspects of the present disclosure.

FIG. 18 shows a representative contour map of an example wing or shroud 1850 relative to modular structures 1804A, 1084B.

Figure 19:
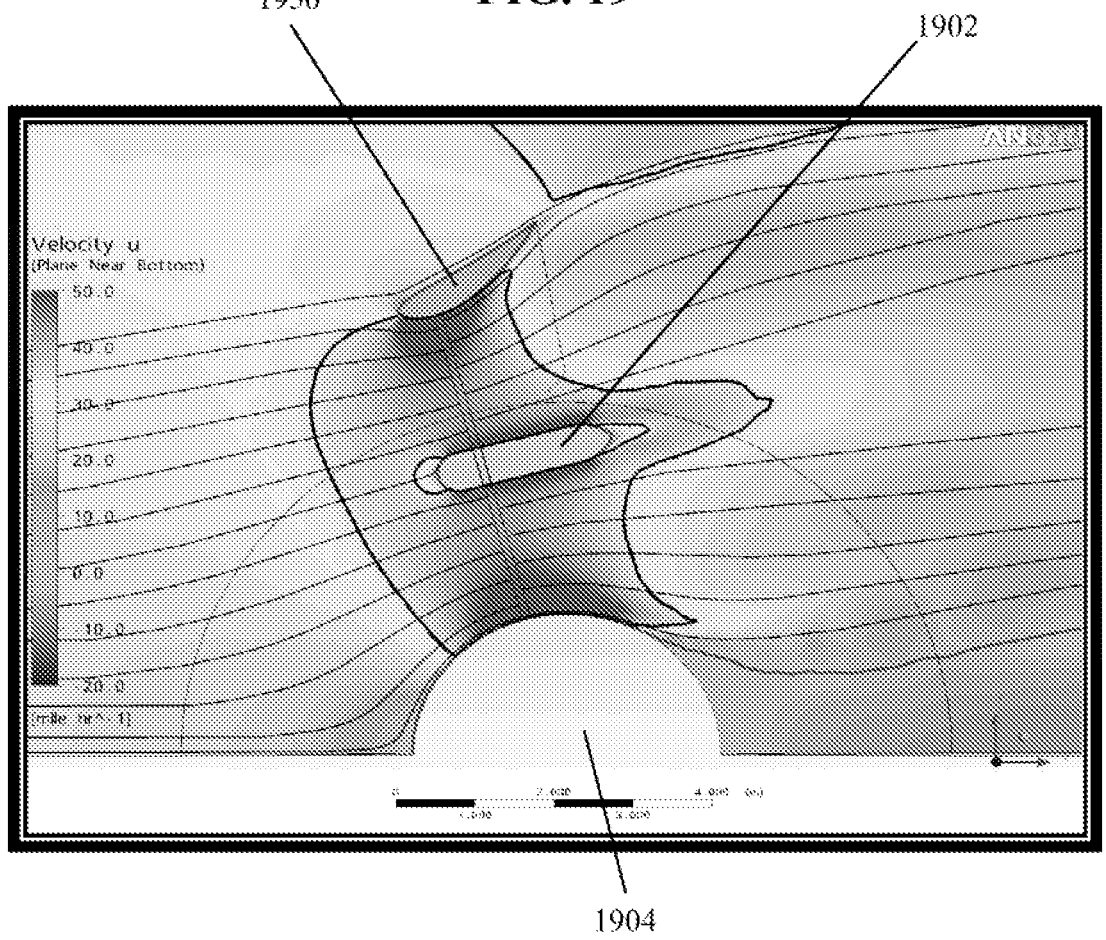
FIG. 19 shows a velocity map of fluid (e.g., wind) flow pattern about an example wing or shroud, body of a turbine, and a proximal edge of a portion of a support structure, in accordance with aspects of the present disclosure.

FIG. 19 shows a velocity map of fluid (e.g., wind) flow pattern about an example wing or shroud 1950, body 1902 of a turbine, and a proximal edge of a portion of a support structure 1904.

Figure 20A:
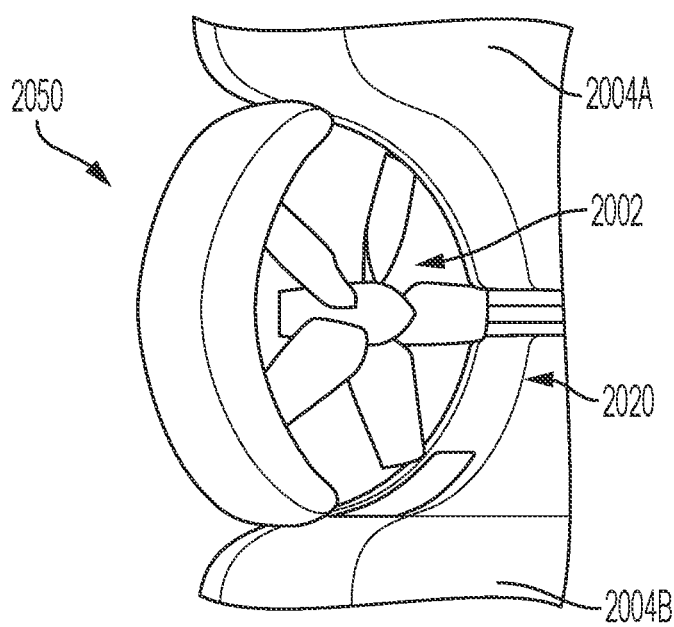
Figure 20B:
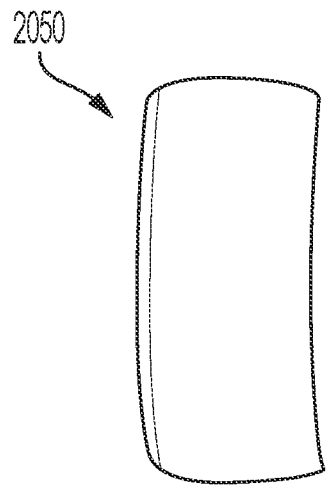
Figure 25A:
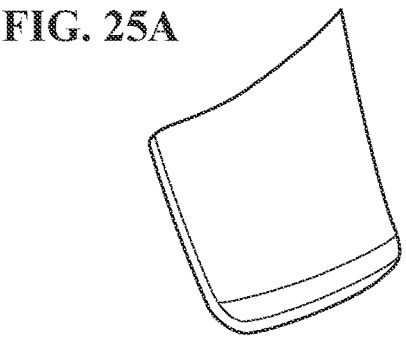
FIGS. 25A-25D and 26A-26D show various views of first and second additional example shrouds or wings, in accordance with aspects of the present disclosure.
Figure 25B:
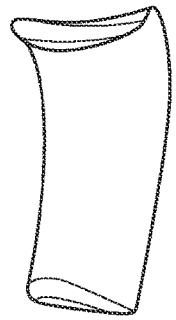
Figure 25C:
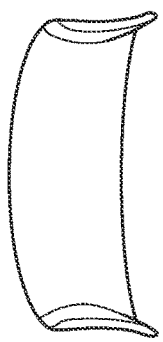
Figure 25D:
Figure 26A:
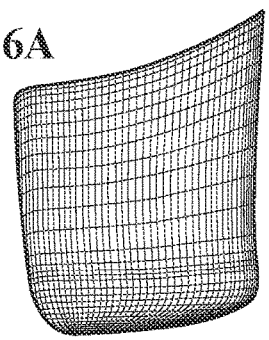
Figure 26B:
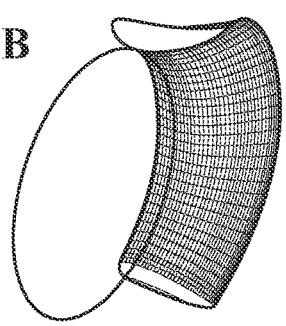
Figure 26C:
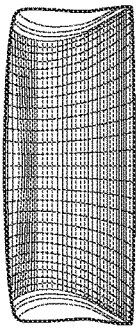
Figure 26D:
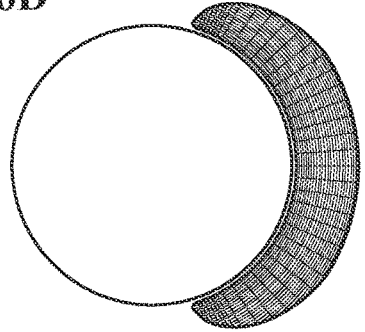

FIGS. 20A-20E show various views and aspects of another example wing or shroud, in accordance with aspects of the present disclosure. FIG. 20A shows a perspective view of a portion of modular support structures 2004A, 2004B forming a recess 2020. A turbine 2002 having a corresponding shroud or wing 2050 is shown as partially located within the recess 2020. FIG. 20B shows a side view of the shroud or wing 2050 of FIG. 20A. FIGS. 20C and 20D show perspective views of the shroud or wing 2050 of FIGS. 20A and 20B. FIG. 20E shows another side view of the shroud or wing of FIGS. 20A-20D with airflow indicated.

FIG. 21 and associated description shown provide explanation of air foil effects that may apply and be useful to operation of shrouds or wings in the context of air flow management for wind turbines.

FIGS. 22A-22D show views of the cross-sectional shape of several example shrouds or wings, and various features thereof, including use of flaps, in accordance with aspects of the present disclosure. As indicated in relation to FIGS. 22A-22D, the flaps may help with influencing wind speed with regard to a turbine in the vicinity of such shrouds or wings having usable flaps.

FIGS. 23 and 24 present views of example towers having support structures, turbines, and shrouds or wings. In FIG. 23, the turbines and shrouds or wings are shown radially moved to positions where only the sides of the shrouds or wings are visible. In FIG. 23, the turbines and shrouds or wings are shown radially move to positions where the turbines are fully visible.

FIGS. 25A-25D and 26A-26D show various views of first and second additional example shrouds or wings, in accordance with aspects of the present disclosure.

FIGS. 27A-27D show example representative views of example modular support structures forming a recess, turbines, and components of fluid (e.g., air) flow contours relative to the recess, in accordance with aspects of the present disclosure. FIG. 28 shows another example representative view of example modular support structures forming a recess, turbines, and area of fluid (e.g., air) flow activity relative to the recess, in accordance with aspects of the present disclosure.

In one example implementation, the wind turbine unit may include a control system and corresponding software that may assist in governing operation of the unit, for example. In one example implementation, the control system may be capable of providing monitoring and operational controls up to twenty four hours a day. The computer control system may assist, for example, in causing the turbines and/or shrouds/wings to be positioned most effectively to generate power from the wind.

This positioning may be accomplished by movement of a turbine and/or shroud/wing along a rail or other mechanism so that the turbine moves radially about the toroidal support structure so as to face the air flow of the wind, for example, when turbine speed and/or power generation may be sought to be maximized. This positioning may also include a capability to provide feathering of the blades on a turbine. In certain wind speeds, the most effective position may include facing the turbine most directly into the wind.

As wind speeds increase, the blades may begin to rotate at a speed that could cause damage to the turbine unit. At these speeds, the computer control system may take action to slow the rotation speed of the blades, for example. The blades may be slowed by feathering the blades on the turbine. Feathering the blades may include altering the pitch of the blades on the turbine. The blades may also be slowed by moving the turbine along the rail to a position that does not face directly into the wind.

In one example implementation, the wind turbine control system may include radar that is able to detect objects that may come into contact with at least one of the wind turbines. For example, the radar system may detect a flock of birds, bats, or other objects incoming towards the turbines. Based on the radar detection, the turbine blades may be stopped or moved, for example. This operation may occur based upon a manual computer command issued from a user, for example. This operation may also be set, for example, to occur automatically. The computer system may be instructed to stop the turbine blades when interfering objects are detected on the radar system.

In another example implementation, image based detection may be employed to detect individual objects that might come into contact with at least one turbine. The image based detection unit may be interoperated with the computer system to shut down only the turbines with which the object may be predicted to likely come into contact. This approach allows the wind turbine to continue to generate power based on the non-affected turbines in the multi-turbine unit, for example, while also preventing damage to wildlife and the turbine blades.

The amount of birds, bats, and other interfering objects potentially impacting the wind generator may vary depending upon location of the wind turbine unit. Therefore, in an area with many potentially interfering objects, a vent or screening feature may be added to the wind turbine unit that may help prevent birds, etc. from coming into contact with the turbine blades.

The computer system may further include a predictive wind model control component that has a capability to cause rotation of the turbines to meet the wind based on a predictive model of wind tracking. Wind is typically not constant. Although air flow may temporarily shift directions, often wind flow will return to the previous direction within a certain amount of time. A predictive model may often be created based upon the typical wind characteristics of an area in which the wind turbine is located. The computer system may rotate the wind turbines to face the wind in a most efficient position for generating energy. Then, using the predictive model, the computer system may wait a predetermined amount of time after the wind shifts before rotating the wind turbines to face into the new wind direction. The predetermined amount of time may include the amount of time in which the wind typically returns to its previous direction. This approach may prevent the wind turbine from moving to track a change in wind, for example, only to have the wind return to its previous position within a short period of time. By using the predictive model, the wind turbine may be faced most efficiently into the air flow of the wind an increased amount of time.

In one example aspect, a wind turbine system is provided, wherein the wind turbine system comprises: a mounting frame; a fixed toroidal support structure attached to the mounting frame, the toroidal support structure having a concave portion and a convex portion; a wind turbine located proximal to the concave portion of the toroidal support structure, wherein the wind turbine travels about at least a portion of the concave portion of the toroidal support structure; and a first baffle, wherein the first baffle extends about the portion of the concave portion of the toroidal support structure about which the first turbine travels, wherein the baffle surrounds a portion of the wind turbine opposite the fixed toroidal support structure, and wherein the baffle includes at least one component selectively variably adjustable so as to vary the force, direction, or disruption of flow of fluid thereby, relative to the wind turbine.

In one example aspect, the wind turbine system further comprises a control system configurable for: monitoring and controlling operations of the wind turbine system, the controlling of the operations including at least causing the wind turbine or baffle to be positioned to maximize generation of power from wind.

In one example aspect, the control system further being configurable for: determining when the wind turbine is rotating at a speed greater than or equal to a threshold speed, the threshold speed being set to indicate that a rotation of the wind turbine at a speed exceeding the threshold speed is associated with a risk of damage to the wind turbine; and reducing the rotation speed of the wind turbine to a speed below the threshold speed.

In one example aspect, the rotation speed is reduced by at least one of: feathering at least one blade on the wind turbine, wherein the feathering includes at least altering a pitch of the at least one blade; and moving the wind turbine to a position that does not face directly into the wind.

In one example aspect, the control system further comprises a radar, wherein the radar is configurable to detect an object in a vicinity of the wind turbine, and wherein the detection of the object is performed prior to the object being in a physical contact with the wind turbine.

In one example aspect, when the object is detected by the radar, the control system takes an action to reduce damage to the wind turbine, the action including at least stopping one or more blades of the wind turbine.

In one example aspect, the control system stops only the blades with which the object is predicted as being likely to come into physical contact.

In one example aspect, the computer system further comprises: a predictive wind model control component configurable to control the rotation of the wind turbine to meet the wind based on a predictive model of wind tracking, wherein the controlling of the rotation is performed to position the wind turbine to a most efficient position for generating energy.

In one example aspect, the predictive model of the wind tracking is created based upon typical wind characteristics of an area in which the wind turbine is located.

In one example aspect, the computer system waits a predetermined amount of time after a shift in wind is detected before rotating the wind turbine to face into a new direction.

In one example aspect, the predetermined amount of time comprises at least an amount of time in which the wind typically returns to its previous direction based upon typical wind characteristics of the area in which the wind turbine is located.

In one example aspect, the toroidal support structure comprises carbon fiber.

In one example aspect, the toroidal support structure has a thickness of about ¼ inch and a corresponding strength to withstand 220 mile per hour winds.

In one example aspect, the toroidal support structure comprises a plurality of toroidal-shaped modular support structure elements, wherein the modular support structure elements are abuttably positioned in series so as to form two radially extending concave recesses; wherein the baffle is securably and radially moveably positioned relative to each recess so as to form therewith a respective wind-funneling opening with the wind turbine, and so as to be radially positionable relative to a wind direction, in concert with the baffle and the respective recess.

In one example aspect, the wind turbine system is configurable to switch between a first mode and a second mode, the first mode being for operating to generate power from the wind and the second mode is for operating, at least in part, as a motor in order to resist rotation from the wind, and wherein the switching between the first and second modes is based on wind speed.

In one example aspect, a method of positioning one or more of a plurality of wind turbines of the wind turbine system is provided. The positioning is performed to place the wind turbines to most effectively generate power from wind, wherein the positioning is performed by variably adjusting the force, direction, or disruption of flow of fluid thereby, relative to at least one of the plurality of wind turbines.

In one example aspect, the method further comprises: using a control system of the wind turbine system, determining when the wind turbine is rotating at a speed greater than or equal to a threshold speed, the threshold speed being set to indicate that a rotation of the wind turbine at a speed exceeding the threshold speed is associated with a risk of damage to the wind turbine; and reducing the rotation speed of the wind turbine to a speed below the threshold speed.

In one example aspect, the method further comprises: detecting an object in a vicinity of the wind turbine using a radar; and when the object is detected by the radar, using a control system of the wind turbine system, taking an action to reduce damage to the wind turbine, the action including at least stopping one or more blades of the wind turbine.

In one example aspect, a non-transitory computer readable medium storing thereon computer executable instructions for positioning one or more of a plurality of wind turbines of the wind turbine system is provided. The positioning is performed to place the wind turbines to most effectively generate power from wind, wherein the positioning is performed by variably adjusting the force, direction, or disruption of flow of fluid thereby, relative to at least one of the plurality of wind turbines.

In one example aspect, the instructions further comprise instructions for: determining when the wind turbine is rotating at a speed greater than or equal to a threshold speed, the threshold speed being set to indicate that a rotation of the wind turbine at a speed exceeding the threshold speed is associated with a risk of damage to the wind turbine; and reducing the rotation speed of the wind turbine to a speed below the threshold speed.

In one example aspect, the instructions further comprise instructions for: detecting an object in a vicinity of the wind turbine using a radar; and when the object is detected by the radar, taking an action to reduce damage to the wind turbine, the action including at least stopping one or more blades of the wind turbine.

Figure 29:
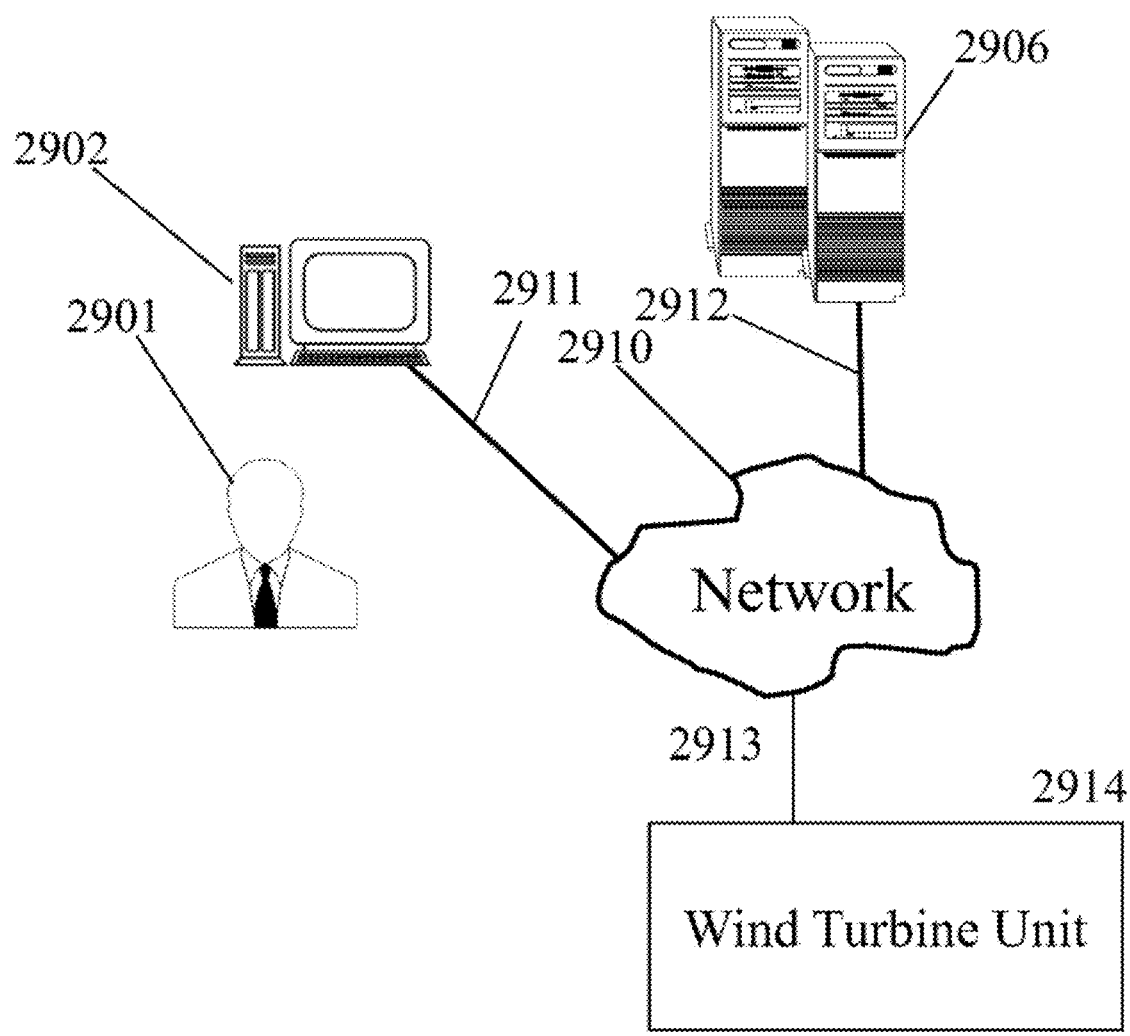
FIG. 29 shows various features of an example computer system, including a network, for use in conjunction with aspects of the present disclosure.

FIG. 29 shows various features of an example computer system for use in conjunction with aspects of the present disclosure. Although computer monitoring and control of the wind turbine unit may be automated, in one example implementation as shown in FIG. 29, the computer system may also be accessed by a user 2901 to input or access data, monitor wind speeds, monitor radar, to position the turbines, to feather the turbine blades, and to rotate the tower out of the wind, and to perform other steps in accordance with example methods in accordance with aspects of the present disclosure, such as by using software and other computer features located on a server or other network device 2906. Access may occur, for example, via a terminal 2902, network (e.g., the Internet) 2910, and couplings 2911, 2912, 2913. Access to the wind turbine unit may occurs via coupling 2913. The terminal 2902 may comprise, for example, a personal computer (PC), minicomputer, mainframe computer, microcomputer, telephone device, personal digital assistant (PDA), or other device having a processor and input capability. The server 2906 may comprise, for example, a PC, minicomputer, mainframe computer, microcomputer, or other device having a processor and a repository for data or that is capable of accessing a repository of data. Couplings 2911, 2912, 2913 may include wired, wireless, or fiberoptic links, for example.

Figure 30:
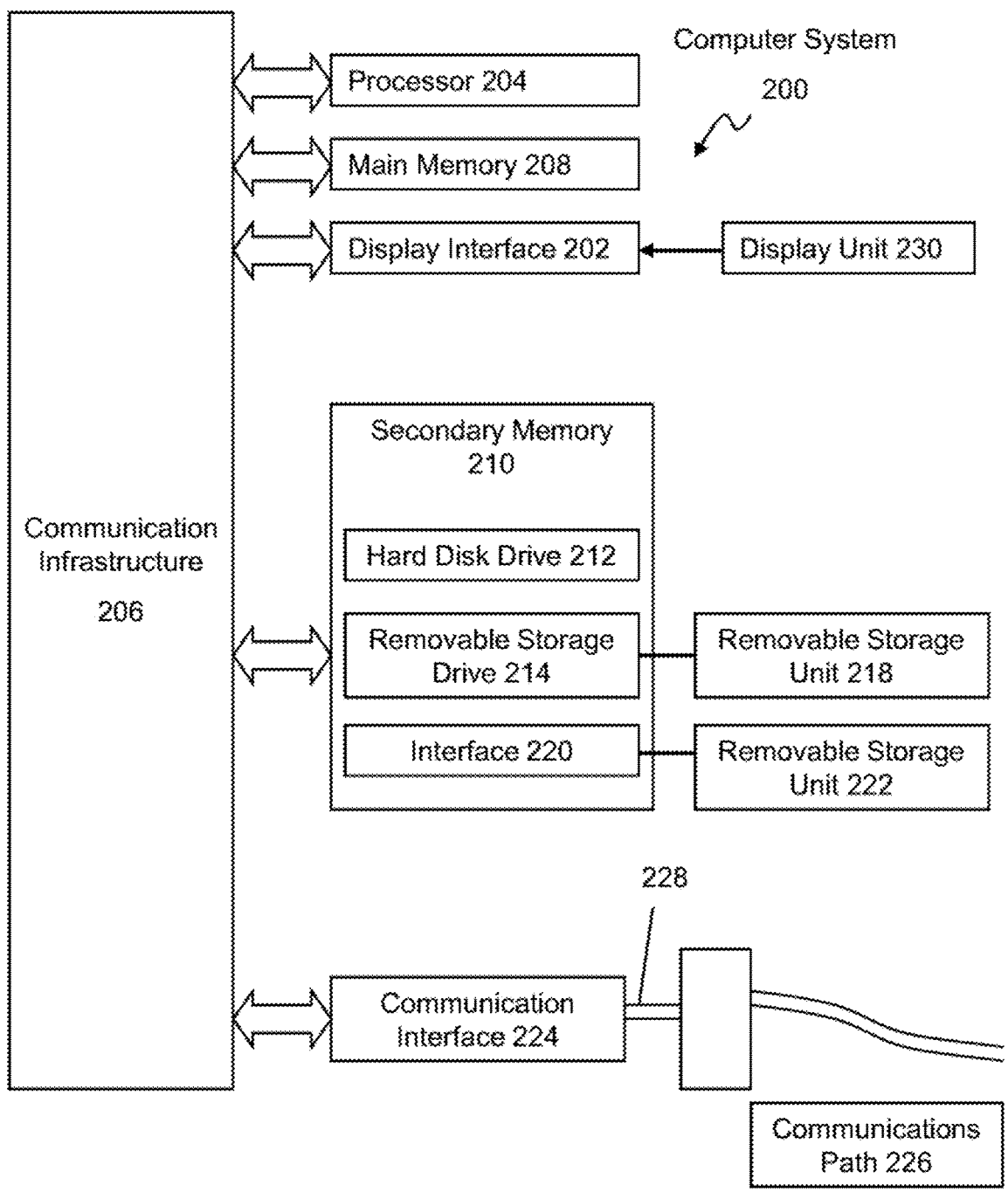
FIG. 30 shows various aspects of an example computer system usable with aspects of the present disclosure.

Aspects of the present disclosure may be implemented using hardware, software or a combination thereof and may be implemented in one or more computer systems or other processing systems. In one example implementation, aspects of the disclosure may be directed toward one or more computer systems capable of carrying out the functionality described herein. An example of such a computer system 200 is shown in FIG. 30.

Computer system 200 includes one or more processors, such as processor 204. The processor 204 is connected to a communication infrastructure 206 (e.g., a communications bus, cross-over bar, or network). Various software aspects are described in terms of this example computer system. After reading this description, it will become apparent to a person skilled in the relevant art(s) how to implement various features in accordance with aspects of the present disclosure using other computer systems and/or architectures.

Computer system 200 can include a display interface 202 that forwards graphics, text, and other data from the communication infrastructure 206 (or from a frame buffer not shown) for display on the display unit 230. Computer system 200 also includes a main memory 208, preferably random access memory (RAM), and may also include a secondary memory 210. The secondary memory 210 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well-known manner. Removable storage unit 218, represents a floppy disk, magnetic tape, optical disk, etc., which is read by and written to removable storage drive 214. As will be appreciated, the removable storage unit 218 includes a computer usable storage medium having stored therein computer software and/or data.

In alternative example implementations, secondary memory 210 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 214, a hard disk installed in hard disk drive 212, and signals 228. These computer program products provide software to the computer system 200. Aspects of the present disclosure are directed to such computer program products.

Computer programs (also referred to as computer control logic or software) are stored in main memory 208 and/or secondary memory 210. Computer programs may also be received via communications interface 224. Such computer programs, when executed, enable the computer system 200 to perform the features in accordance with aspects of the present disclosure, as discussed herein. In particular, the computer programs, when executed, enable the processor 204 to perform the features in accordance with aspects of the present disclosure. Accordingly, such computer programs represent controllers of the computer system 200.

In an example implementation where aspects are implemented using software, the software may be stored in a computer program product and loaded into computer system 200 using removable storage drive 214, hard drive 212, or communications interface 224. The control logic (software), when executed by the processor 204, causes the processor 204 to perform the functions in accordance with aspects of the present disclosure, as described herein. In another example implementation, aspects of the present disclosure are implemented primarily in hardware using, for example, hardware components, such as application specific integrated circuits (ASICs). Implementation of the hardware state machine so as to perform the functions described herein will be apparent to persons skilled in the relevant art(s).

In yet another example implementation, aspects of the present disclosure may be implemented using a combination of both hardware and software.

Example implementations in accordance with aspects of the present disclosure have now been described in accordance with the above advantages. It will be appreciated that these examples are merely illustrative of such aspects. Many variations and modifications will be apparent to those skilled in the art.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

The invention claimed is:

1. A wind turbine system, comprising:
a mounting frame;
a fixed toroidal support structure attached to the mounting frame, the toroidal support structure having a concave portion and a convex portion, the fixed toroidal support structure including an inflatable surface skin configured to be inflated via a compressor;
a wind turbine located proximal to the concave portion of the toroidal support structure, wherein the wind turbine travels about at least a portion of the concave portion of the toroidal support structure; and
a baffle, wherein the baffle extends about the portion of the concave portion of the toroidal support structure about which the wind turbine travels,
wherein the baffle surrounds a portion of the wind turbine opposite the fixed toroidal support structure, and
wherein the baffle includes at least one component selectively variably adjustable so as to vary a force, direction, or disruption of flow of fluid thereby, relative to the wind turbine.

2. The wind turbine system of claim 1, further comprising:
a control system configurable for:
monitoring and controlling operations of the wind turbine system, the controlling of the operations including at least causing the wind turbine or baffle to be positioned to maximize generation of power from wind.

3. The wind turbine system of claim 2, the control system further being configurable for:
determining when the wind turbine is rotating at a speed greater than or equal to a threshold speed, the threshold speed being set to indicate that a rotation of the wind turbine at a speed exceeding the threshold speed is associated with a risk of damage to the wind turbine; and
reducing the rotation speed of the wind turbine to a speed below the threshold speed.

4. The wind turbine system of claim 3, wherein the rotation speed is reduced by at least one of:
feathering at least one blade on the wind turbine, wherein the feathering includes at least altering a pitch of the at least one blade; or
moving the wind turbine to a position that does not face directly into the wind.

5. The wind turbine system of claim 2, wherein the control system further comprises a radar, wherein the radar is configurable to detect an object in a vicinity of the wind turbine, and wherein the detection of the object is performed prior to the object being in a physical contact with the wind turbine.

6. The wind turbine system of claim 5, wherein, when the object is detected by the radar, the control system takes an action to reduce damage to the wind turbine, the action including at least stopping the wind turbine.

7. The wind turbine system of claim 6, wherein the control system stops only the turbine with which the object is predicted as being likely to come into physical contact.

8. The wind turbine system of claim 2, further comprising a computer system, wherein the computer system includes:
a predictive wind model control component configurable to control a rotation of the wind turbine to meet the wind based on a predictive model of wind tracking, wherein the controlling of the rotation is performed to position the wind turbine to a most efficient position for generating energy.

9. The wind turbine system of claim 8, wherein the predictive model of the wind tracking is created based upon typical wind characteristics of an area in which the wind turbine is located.

10. The wind turbine system of claim 8, wherein the computer system waits a predetermined amount of time after a shift in wind is detected before rotating the wind turbine to face into a new direction.

11. The wind turbine system of claim 10, wherein the predetermined amount of time comprises at least an amount of time in which the wind typically returns to its previous direction based upon typical wind characteristics of an area in which the wind turbine is located.

12. The wind turbine system of claim 1, wherein the toroidal support structure comprises carbon fiber.

13. The wind turbine system of claim 1, wherein the toroidal support structure has a thickness of about ¼ inch and a corresponding strength to withstand 220 mile per hour winds.

14. The wind turbine system of claim 1, wherein toroidal support structure comprises a plurality of toroidal-shaped modular support structure elements,
wherein the modular support structure elements are proximally positioned so as to form two radially extending concave recesses;
wherein the baffle is securably and radially moveably positioned relative to each recess so as to form therewith a respective wind-funneling opening with the wind turbine, and so as to be radially positionable relative to a wind direction.

15. The wind turbine system of claim 1, wherein the system is configurable to switch between a first mode and a second mode, the first mode being for operating to generate power from the wind and the second mode is for operating, at least in part, as a motor in order to resist rotation from the wind, and wherein the switching between the first and second modes is based on wind speed.

16. A method of positioning the wind turbine system of claim 1, the positioning being to most effectively generate power from wind, the positioning being performed by variably adjusting the force, direction, or disruption of flow of fluid thereby, relative to the wind turbine.

17. The method of claim 16, wherein the wind turbine system includes a controller, the method further comprising:
the controller determining when the wind turbine is rotating at a speed greater than or equal to a threshold speed, the threshold speed being set to indicate that a rotation of the wind turbine at a speed exceeding the threshold speed is associated with a risk of damage to the wind turbine; and
reducing the rotation speed of the wind turbine to a speed below the threshold speed.

18. The method of claim 16, further comprising:
detecting an object in a vicinity of the wind turbine using a radar; and
when the object is detected by the radar, using a control system of the wind turbine system, taking an action to reduce damage to the wind turbine, the action including at least stopping the wind turbine.

19. A non-transitory computer readable medium storing thereon computer executable instructions for positioning the wind turbine of the wind turbine system of claim 1, the positioning being to most effectively generate power from wind, the positioning being performed by variably adjusting the force, direction, or disruption of flow of fluid thereby, relative to the wind turbine.

20. The non-transitory computer readable medium of claim 19, the instructions further comprising instructions for:
determining when the wind turbine is rotating at a speed greater than or equal to a threshold speed, the threshold speed being set to indicate that a rotation of the wind turbine at a speed exceeding the threshold speed is associated with a risk of damage to the wind turbine; and
reducing the rotation speed of the wind turbine to a speed below the threshold speed.

21. The non-transitory computer readable medium of claim 19, the instructions further comprising instructions for:
detecting an object in a vicinity of the wind turbine using a radar; and
when the object is detected by the radar, taking an action to reduce damage to the wind turbine, the action including the wind turbine.

* * * * *